(12) United States Patent
Premysler

(10) Patent No.: US 9,163,788 B2
(45) Date of Patent: Oct. 20, 2015

(54) ENGINEERED LIGHT DISTRIBUTION LED LIGHT BULBS

(71) Applicant: Philip A. Premysler, Washington, DC (US)

(72) Inventor: Philip A. Premysler, Washington, DC (US)

(*) Notice: Subject to any disclaimer, the term of this patent is extended or adjusted under 35 U.S.C. 154(b) by 0 days.

(21) Appl. No.: 13/623,833

(22) Filed: Sep. 20, 2012

(65) Prior Publication Data

US 2014/0078735 A1 Mar. 20, 2014

Related U.S. Application Data

(60) Provisional application No. 61/536,793, filed on Sep. 20, 2011.

(51) Int. Cl.
| | |
|---|---|
| *F21V 29/10* | (2015.01) |
| *F21V 21/00* | (2006.01) |
| *F21K 99/00* | (2010.01) |
| *G02B 27/00* | (2006.01) |
| *G02B 19/00* | (2006.01) |
| *F21V 29/83* | (2015.01) |
| *F21V 29/02* | (2006.01) |
| *F21V 23/00* | (2015.01) |
| *F21Y 101/02* | (2006.01) |
| *F21Y 103/02* | (2006.01) |
| *F21Y 111/00* | (2006.01) |

(52) U.S. Cl.
CPC . *F21K 9/13* (2013.01); *F21K 9/135* (2013.01); *F21K 9/90* (2013.01); *F21V 29/83* (2015.01); *G02B 19/0014* (2013.01); *G02B 19/0061* (2013.01); *G02B 27/0012* (2013.01); *F21V 23/006* (2013.01); *F21V 29/02* (2013.01); *F21Y 2101/02* (2013.01); *F21Y 2103/022* (2013.01); *F21Y 2111/008* (2013.01)

(58) Field of Classification Search
CPC ............... F21K 9/00; F21K 9/13; F21K 9/58; F21K 9/135
USPC .................... 362/235, 237, 240, 294, 311.02
See application file for complete search history.

(56) References Cited

U.S. PATENT DOCUMENTS

| | | | | |
|---|---|---|---|---|
| 5,806,965 | A * | 9/1998 | Deese ..................... 362/249.04 |
| 6,398,384 | B2 * | 6/2002 | Siminovitch et al. ......... 362/225 |
| 7,387,403 | B2 * | 6/2008 | Mighetto .................... 362/218 |
| 7,641,361 | B2 * | 1/2010 | Wedell et al. ................. 362/240 |
| 2010/0277067 | A1 * | 11/2010 | Maxik et al. .................... 315/32 |
| 2011/0002116 | A1 * | 1/2011 | Chen et al. .................... 362/235 |
| 2011/0149568 | A1 * | 6/2011 | Wilson et al. ................. 362/235 |
| 2011/0248618 | A1 | 10/2011 | Gielen |
| 2012/0033419 | A1 * | 2/2012 | Kim et al. ...................... 362/235 |
| 2012/0081912 | A1 * | 4/2012 | Yamamoto et al. ........... 362/382 |

FOREIGN PATENT DOCUMENTS

WO    WO2010/027345 A1 *   3/2010

* cited by examiner

*Primary Examiner* — Sikha Roy

(57) ABSTRACT

LED light bulbs especially suited for use in table lamps or floor lamps with lamp shades. The LED light bulbs include optics which provide more limited but more uniform illumination of the lamp shade and provide more uniform illumination through the top and bottom apertures of the lamp shade. The light bulbs comprise an electrical coupling base (e.g., Edison screw base) coupled via an insulating coupling piece to a tube. Metal Core Printed Circuit Boards on which LEDs with lenses are mounted are mechanically coupled to the tube.

8 Claims, 19 Drawing Sheets

Prior Art

_Prior Art_

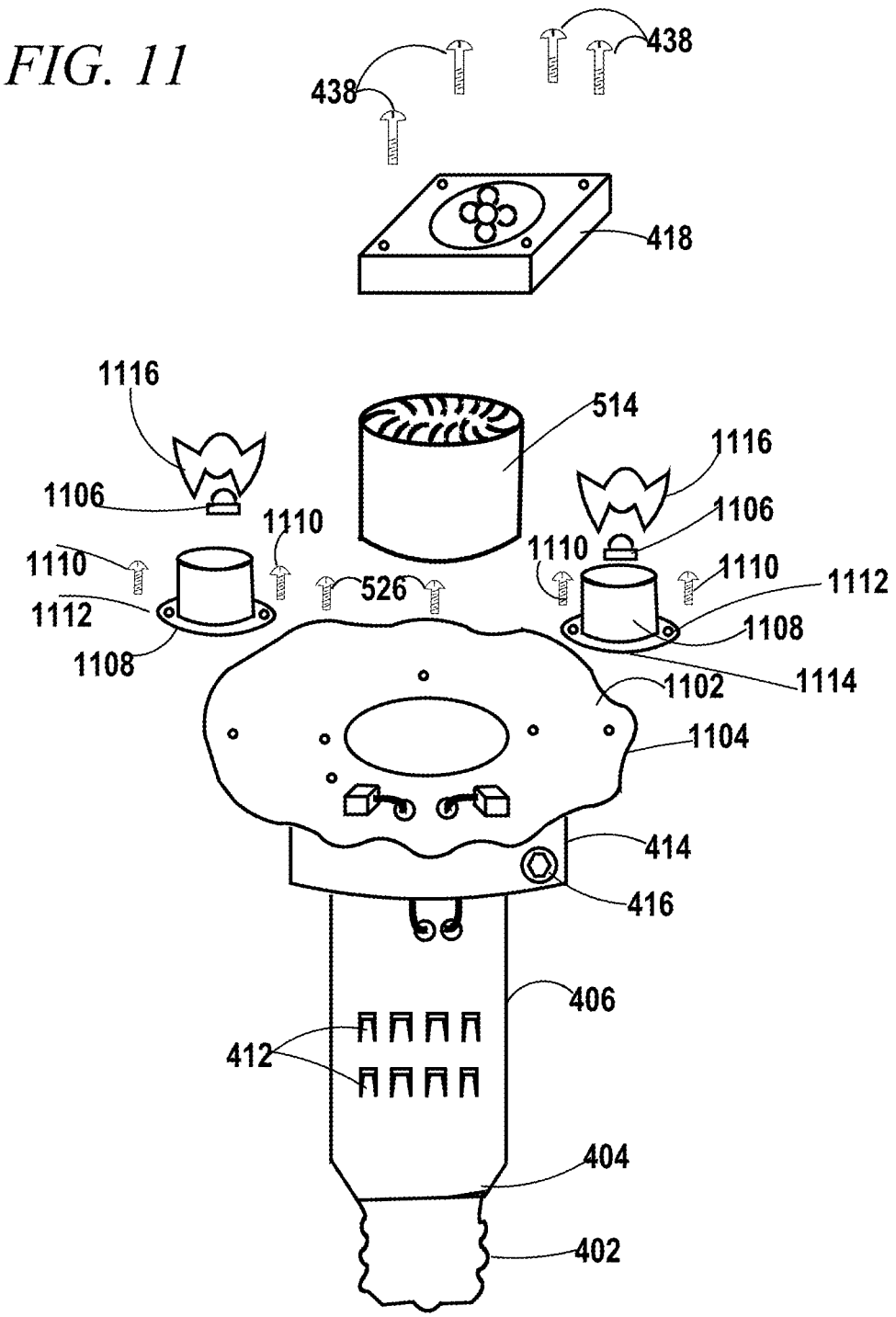

upper primary lower primary

UPPER SECONDARY

LOWER SECONDARY

FIG. 22
FIG. 23
FIG. 24
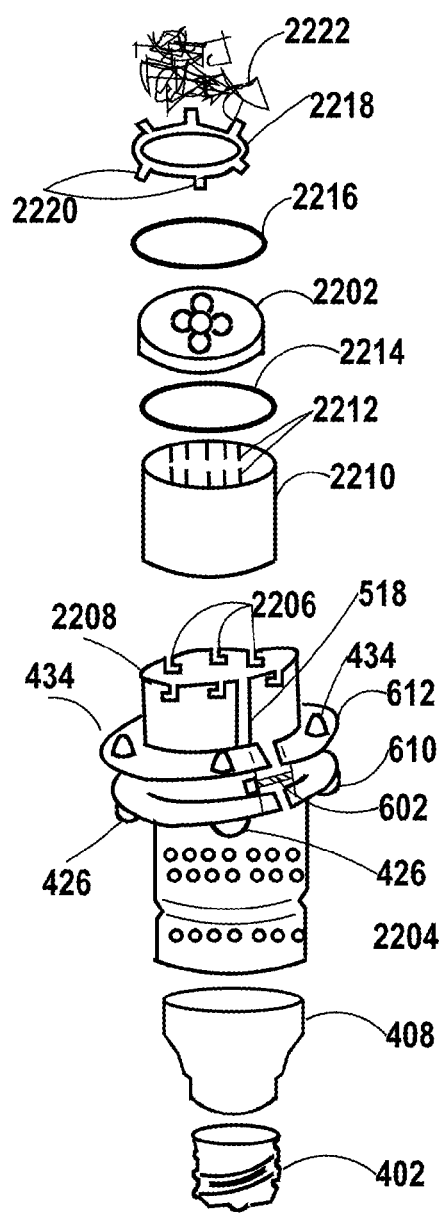
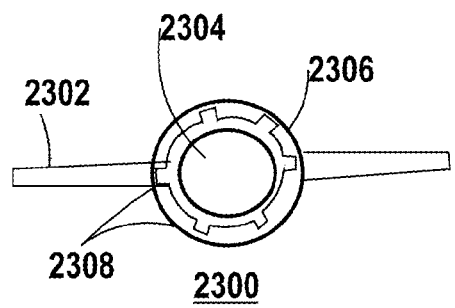
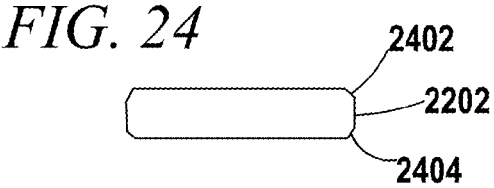

FIG. 30
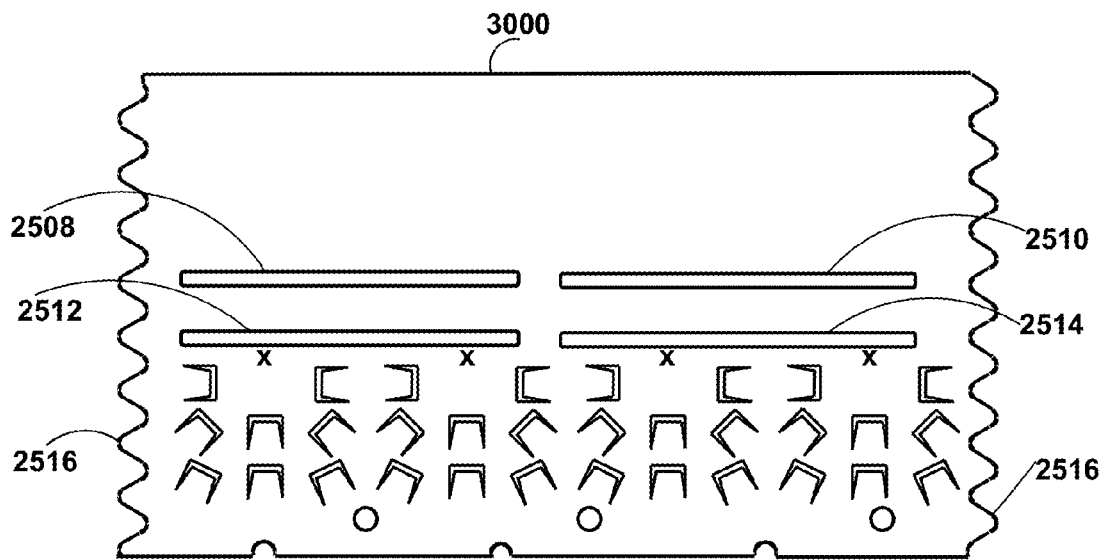
FIG. 31
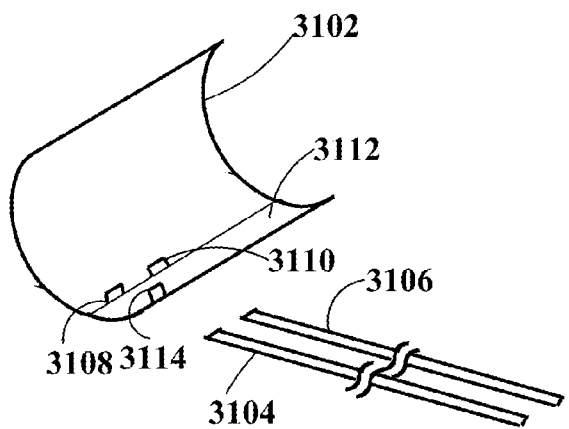

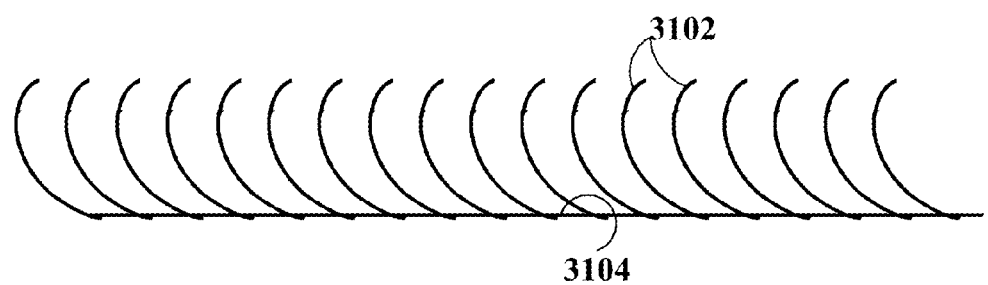

3200

3400

US 9,163,788 B2

ENGINEERED LIGHT DISTRIBUTION LED LIGHT BULBS

FIELD OF THE INVENTION

The present invention relates generally to general illumination.

CROSS REFERENCE TO RELATED APPLICATION

This present application is based in part on provisional patent application 61/536,793 filed Sep. 20, 2011.

BACKGROUND

Usage of common household light bulbs (known in the industry as an "A-lamps") and Compact Fluorescent Lamps (CFL) in table lamps and floor lamps accounts for a large portion of the energy consumed by such lamps. Table lamps and floor lamps are well established as domestic furnishings and thus likely to persist into the future notwithstanding introduction of new more efficient light source technology. Thus there is need to adapt new light source technology to these traditional portable fixtures types, and it would be more desirable to maximize efficiency and performance of new technology when used in these traditional portable fixtures.

Floor lamps and table lamps typically have a lamp shade that blocks a direct view of the light bulb, so as to prevent visual discomfort associated with glare. Typically, especially in the case of table lamps (though not universally), the lamp shade has a larger bottom aperture and smaller top aperture. Illumination passing through the bottom aperture provides task illumination that is useful for reading or performing other tasks when seated next to the lamp. Illumination passing through the top aperture is reflected off nearby walls and ceilings and provides indirect general illumination of the room. Lamp shades are generally not highly engineered optical control surfaces. Their main purpose is to prevent glare. A problem with lamp shades is that they create a light distribution which is very non-uniform and strongly peaked at the lamp itself and relatively weak 500 cm to 1 meter away where the light is likely to be most useful to a person seated in the vicinity of the lamp.

FIG. 1 is a schematic illustration of a typical table lamp 100 with a stem 102 extending upward from a lamp body 104 to an Edison socket 106 into which is screwed a light bulb 108. A harp 110 attached to the stem 102 connects to a frame 112 of a traditional lamp shade 114. The shade 114 includes a lower aperture 116 through which light passes to provide task illumination and an upper aperture 118. Dimensions are shown to give some context to the data shown in FIGS. 2-3. A radial axis, labeled R(cm) to denote measurement in units of centimeters, extends radially from the base of the lamp 100.

FIGS. 2 and 3 show illuminances (in units of lux) measured along the radial axis R(cm) with a light meter. The light meter sensor head was oriented facing straight up. FIG. 2 is for measurements with a lamp shade with highly reflective white liner and FIG. 3 is for measurements with a somewhat yellowed old lamp shade. In both FIGS. 2 and 3 the data represented by square symbol data points 202, 302 is for a traditional incandescent A-lamp and the data represented by circle symbol data points 204, 304 is for a CFL. All four measurements showed a light distribution that was peaked at the lamp and undesirably dropped off to substantially lower levels at radial distances where the light would be useful to a person seated in the vicinity of the lamp.

Light Emitting Diode (LED) technology is a new technology for general illumination. However at present omnidirectional LED light bulbs intended to replace the common household light bulb are prohibitively expensive. Name brand LED A lamps presently sold in 2011 for between $40 to $50 each. One factor in the cost is that current designs use cast aluminum bodies. To make each lamp body, molten metal must be let into a mold, the mold allowed time to cool and the part extracted. Then each body must be individually handled in a machining operation to perform steps such as facing thermal mating surfaces and drilling and tapping holes used to secure Metal Core Printed Circuit Boards (MCPCBs) on which LEDs are mounted. It would be desirable to have designs for LED lamps that could be manufactured less expensively and therefore more suitable to mass production on a scale needed for consumer light bulbs. Another important factor in the high cost of LED based A-Lamps is the price of the packaged LED devices themselves. Power LEDs suitable for use in LED A-lamps cost about $1 each. At present the only Energy Star certified LED based A-lamp which provides a replacement for the 60 watt incandescent lamp uses no less than 18 power LEDs. It would be desirable to have a LED based A-lamp that can use fewer LEDs, while make the most of lumens available from the LEDs to provide the end user with superior task illuminance and use less electricity at the same time.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 11 is a partially exploded front view of a directional lamp according to a third embodiment of the invention which shares certain design features with the first and second embodiment;

FIG. 22 is exploded view of LED light bulb with low labor cost low noise fan mounting according to an alternative embodiment of the invention;

FIG. 23 is a working end view of a T-handle tool used in installing the fan in the LED light bulb shown in FIG. 22;

FIG. 24 is a side view of a fan used in the LED light bulb shown in FIG. 22;

FIG. 30 shows the layout of sheet metal used to form the tubular housing of LED light bulbs according to an alternative embodiment of the invention;

FIG. 31 is a perspective view a single fin of a stamped fin heat sink along with a pair of leaf springs used to press a base portion of the fin against the inside diameter of an annular MCPCB according to an alternative embodiment of the invention;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
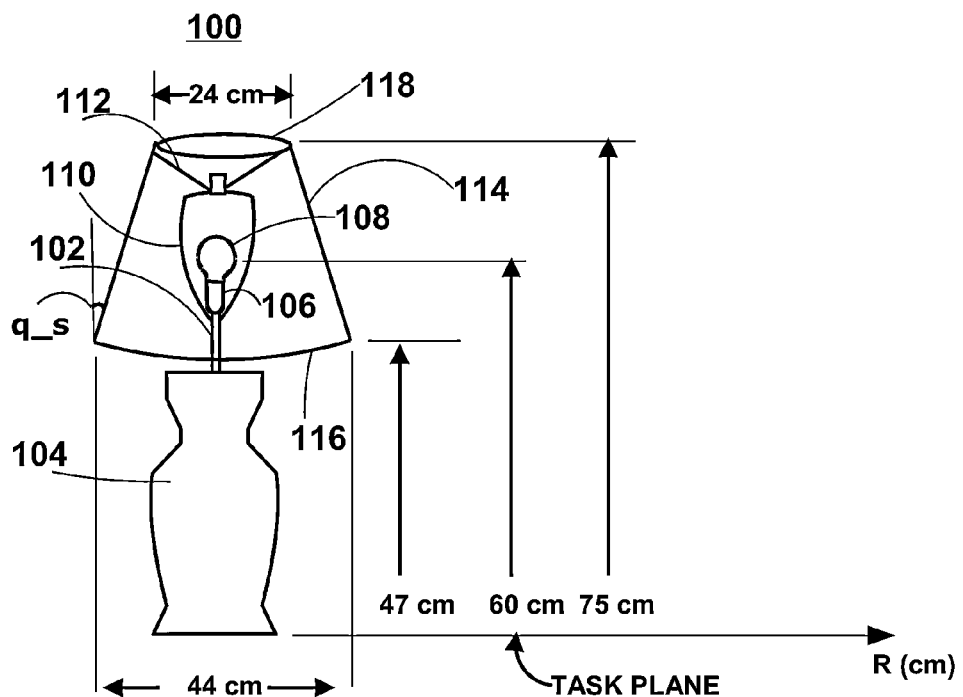
FIG. 1 is schematic illustration of a typical table lamp.
Figure 4:
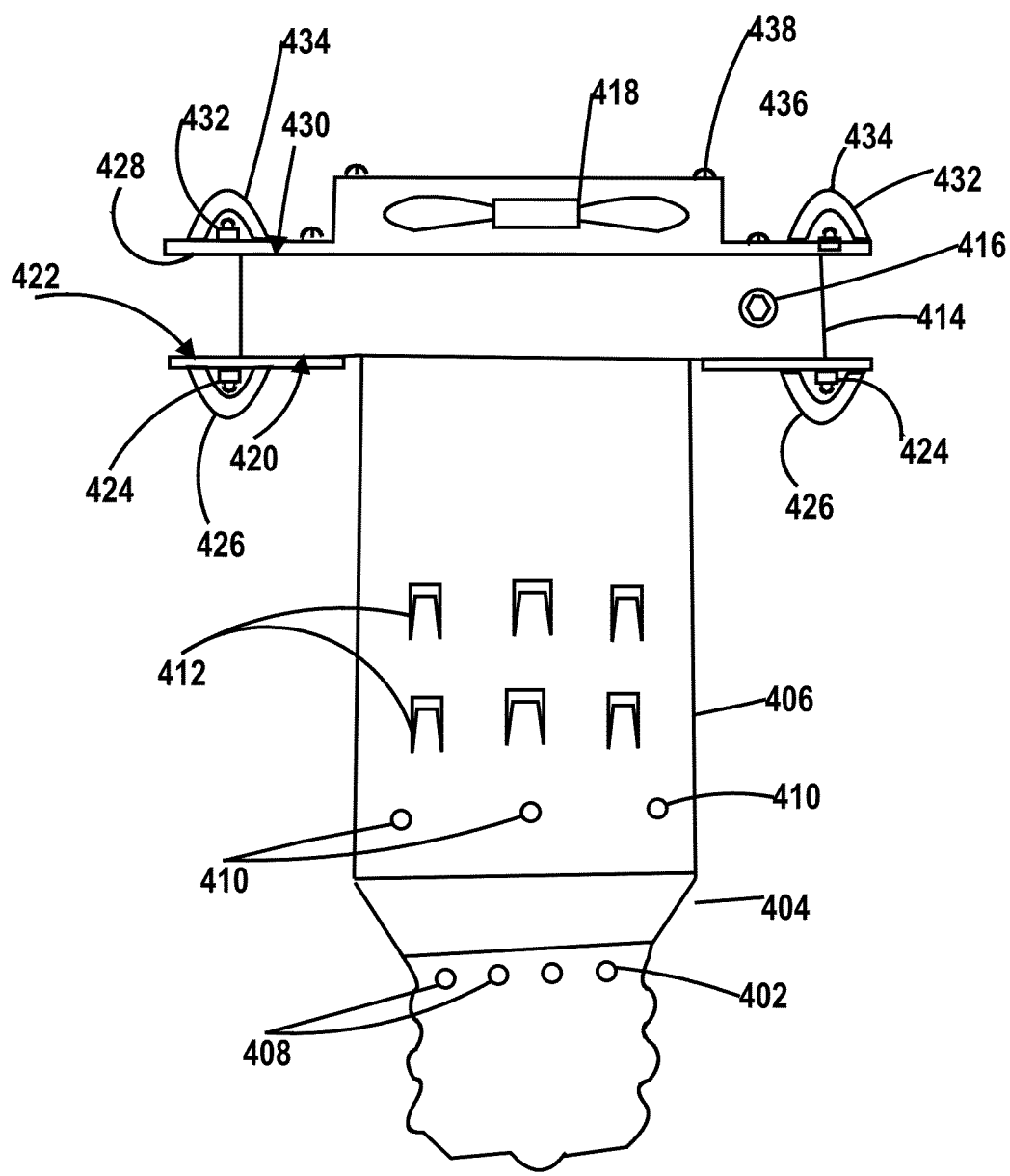
FIG. 4 is a partial X-ray elevation view of a light bulb according to a first embodiment of the invention.
Figure 5:
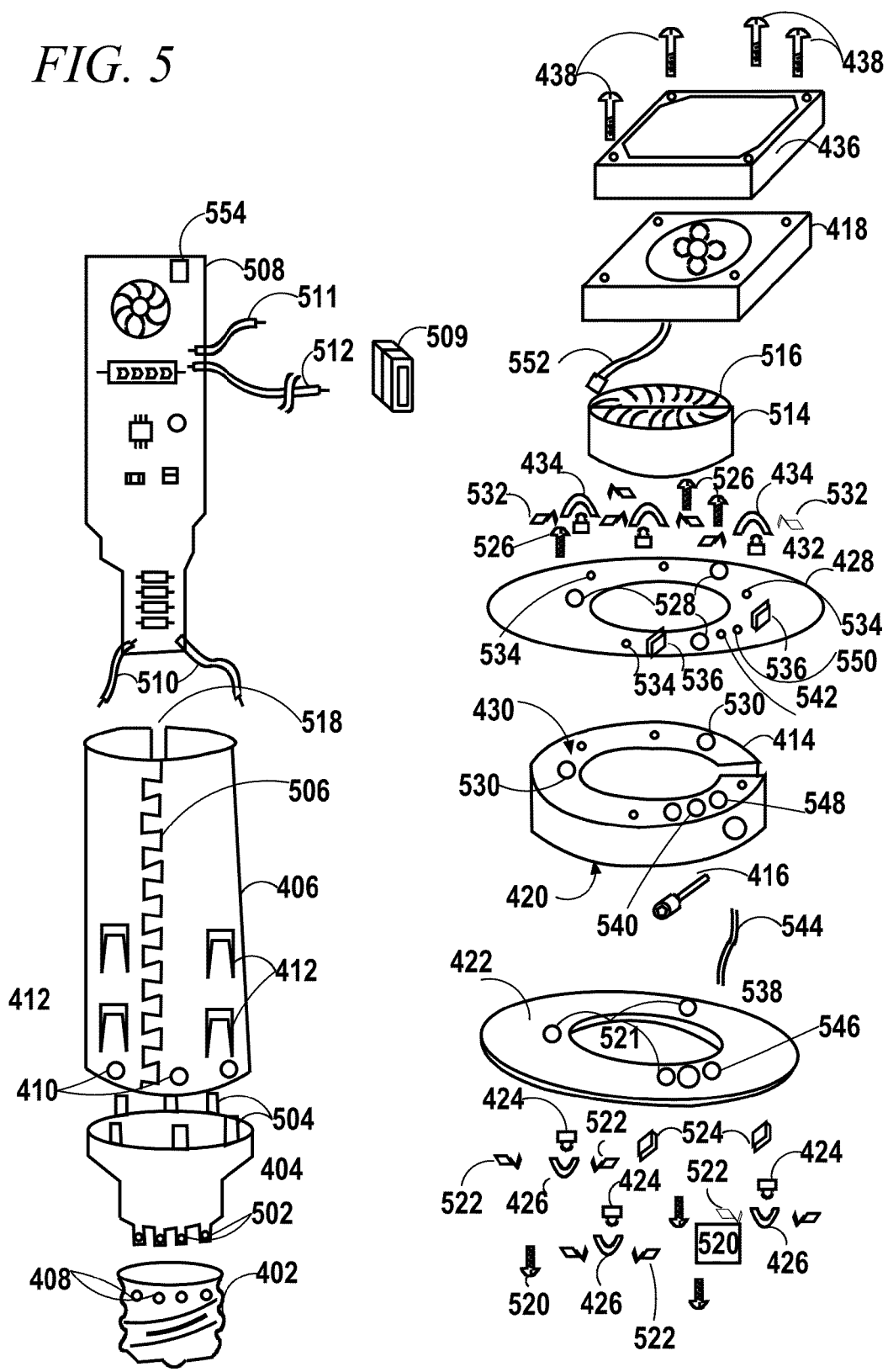
FIG. 5 is an exploded view of the light bulb shown in FIG. 1.

FIGS. 4 and 5 show an LED lamp 400 according to a first embodiment of the invention. The LED lamp 400 is especially suited to replacing an incandescent A-lamp or CFL type light bulb in table lamps or floor lamps that use a lamp shade and in which the light bulb is oriented vertically as shown in FIG. 1. The LED lamp 400 includes an Edison screw base 402 connected by an electrically insulating coupling piece 404 to a tube 406. For adaptation to foreign markets the Edison screw base 402 can be replaced with a different type of base, for example a bayonet type base. The Edison screw base 402 includes a set of punched holes 408. As shown in FIG. 5 the insulating coupling piece 404 includes a first plurality of resilient fingers 502, depending from a bottom end of the coupling piece, that engage in the punched holes 408 when the electrically insulating coupling piece 404 is engaged in the Edison screw base 402. The resilient fingers 502 each have protrusions which seat in the set of punched holes 408. Likewise the tube 406 includes a set of holes 410 (suitably punched, but alternatively otherwise formed). The coupling piece 404 includes a second set of resilient fingers 504 that extend from a top end of the coupling piece 404 and engage in the set of holes 410 in the tube 406 when the coupling piece 404 is engaged with the tube 406. The tube 406 also includes a set of punched louvers 412 that facilitate convection cooling of the lamp 400. As shown in FIG. 5 the tube 406 includes a tongue-and-groove seam 506. The seam is a feature that can be present in the preferred case that the tube 406 is made from a coil of flat stock in a progressive die forming operation. Alternatively a straight butt seam, or other seam is used. All of the holes, slots and louvers can also be conveniently formed in a progressive die manufacturing process. Manufacturing the tube 406 as a stamping is much less costly than the process of die casting individual prior art lamp bodies. Whereas a stamping press operating a progressive die commonly produces a part every 2 seconds or less, a die casting machine typically produces a part every 30 seconds or more. Additionally, stamped parts can be made thinner and therefore use less raw material compared to die cast parts. Furthermore less energy is involved in operating a punch press compared to the energy involved in melting and cooling metal in a die cast machine.

A power supply embodied on a printed circuit board 508 is inserted into the tube 406 coupling piece 404 and Edison base 402. The power supply includes two input power wires 510 for connecting to the Edison base 402 and two output power wires 511, 512 for connecting to power LEDs of the lamp 400. The power supply 508 is suitably an isolated type buck converter and may have dual outputs for independently driving a fan 418 and the aforementioned power LEDs. Alternatively another type of power supply may be used. Alternatively the fan 418 can be in series with all or a subset of the power LEDs.

A collar clamp 414 is positioned about the top end of the tube 406. Alternatively the collar clamp can be positioned lower down on the tube 406. A screw 416 is used to tighten the collar clamp 414 on the top end of the tube 406. A cylindrical heat sink 514 with a cylindrical outside wall and inwardly projecting fins 516 is positioned within the top end of the tube 406 above the power supply 508. The collar clamp 414 clamps the tube 406 against the cylindrical heat sink 514. The tube 406 includes a slot 518 which runs partly down the length of the tube 406 from its top end. The slot 518 facilitates intimate contact between the tube 406 and the cylindrical heat sink 514 under the force of the clamp 414. The output wires 511, 512 pass through an oval grommet 509 that locates in the slot 518. A thermal interface material (TIM) such as thermal grease, thermal paste, thermal adhesive or Indium metal shims may be used between the collar clamp 414 and the tube 406 and between the tube 406 and the cylindrical heat sink 514.

A lower annular shaped MCPCB 422 is screwed to a bottom face 420 of the collar clamp 414 with a number of screws 520 that pass through a set of holes 521 in the MCPCB 422. The bottom face 420 includes a number of threaded, axial oriented holes (not visible in FIG. 4) for receiving the screws 520. A first set of power LEDs 424 is mounted facing down toward the Edison base 402 on the lower MCPCB 422. A first set of secondary lenses 426 is fitted over the first set of power LEDs 424. Surfaces of the lenses 426 are shaped according to equations given in applicants co-pending patent application Ser. No. 13/060,476 Filed Feb. 24, 2011 entitled "Illumination Lenses" which is hereby incorporated herein by reference. Alternatively in lieu of secondary lenses primary lenses which fully encapsulate the LEDs are used. Suitable primary lenses are shaped according to equations given in applicants co-pending patent application Ser. No. 12/629,690 entitled "Illumination Lenses with Light Redistributing Surfaces" which is hereby incorporated herein by reference. The lenses are used to create light distributions which are particularly suitable for use in table lamps or floor lamps with typical lamp shades. In the LED art a "secondary lens" is a separate lens that has a first surface bounded by air and facing the LED through which light enters the secondary lens, and has a second surface bounded by air through which light exits the secondary lens. In contrast a "primary lens", as the term is used in the LED art refers to a lens that includes a refractive medium (e.g., silicone, epoxy, or multipart) that reaches all the way to the LED die so that the primary lens only has a single outer refractive medium to air interface at which light is refracted.

The first set of secondary lenses 426 are held in position with a plurality of surface mount, reflow solderable lens holders 522 taught in applicants co-pending patent application Ser. No. 61/394,499 filed Oct. 19, 2010, entitled "Reflow Solderable, Surface Mount Lens Mounting". Also mounted on the lower surface of the lower MCPCB 422 are two insulation displacement (cutting) surface mount connectors 524 which are used to supply power from the power supply 508 to the LEDs 424.

Similarly an upper annular shaped MCPCB 428 is mounted to a top face 430 of the collar clamp 414 using a set of screws 526 that pass through a set of holes 528 in the upper MCPCB 428 and thread into threaded holes 530. A second set of LEDs 432 is mounted facing upward, away from the Edison base 402 on an upward facing surface of the upper annular shaped MCPCB 428. A second set of secondary lens 434, also shaped according to aforementioned "Illumination Lenses" patent application are mounted over the second set of LEDs 432 using a second plurality of surface mount, reflow solderable lens holders 532. Alternatively primary lenses shaped according to the aforementioned "Illumination Lenses with Light Redistributing Surfaces" patent are used on the upper annular shaped MCPCB 428.

Figure 2:
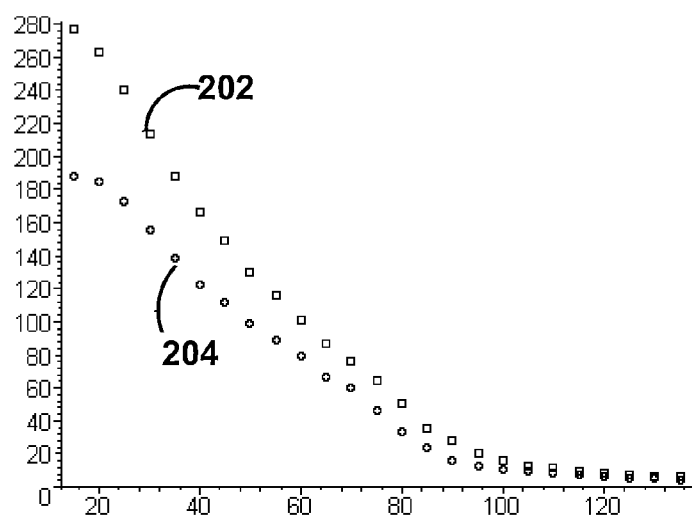
FIG. 2-3 are graphs including plots of illuminance vs. radial position produced by the table lamp shown in FIG. 1 when using common incandescent and CFL light bulbs.
Figure 3:
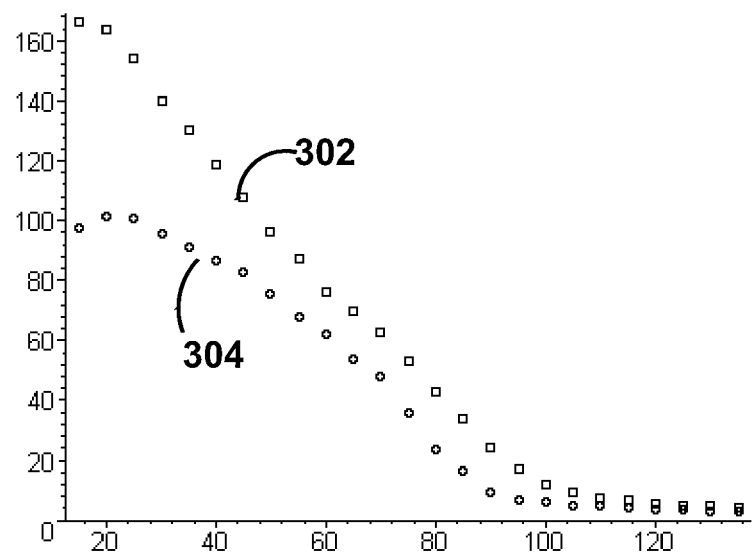
Figure 12:
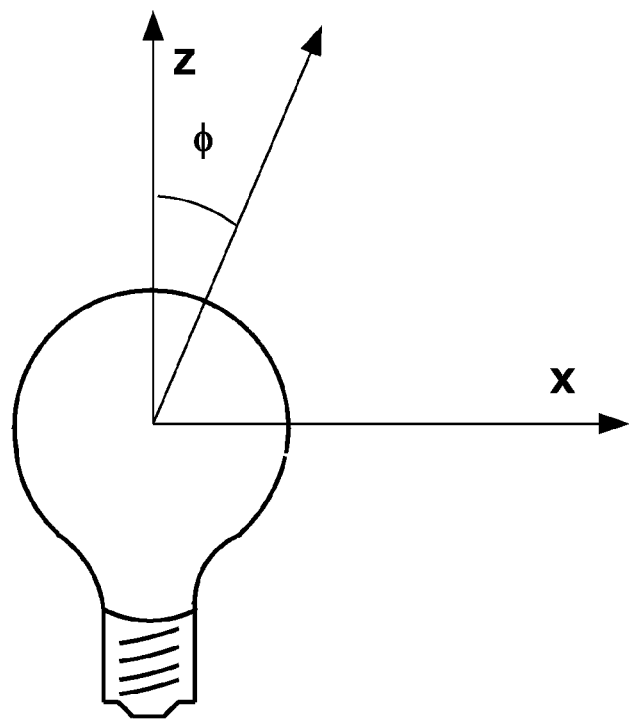
FIG. 12 is a schematic illustration of a light bulb with superimposed X-Z coordinate system and indicating a zenith angle.
Figure 13:
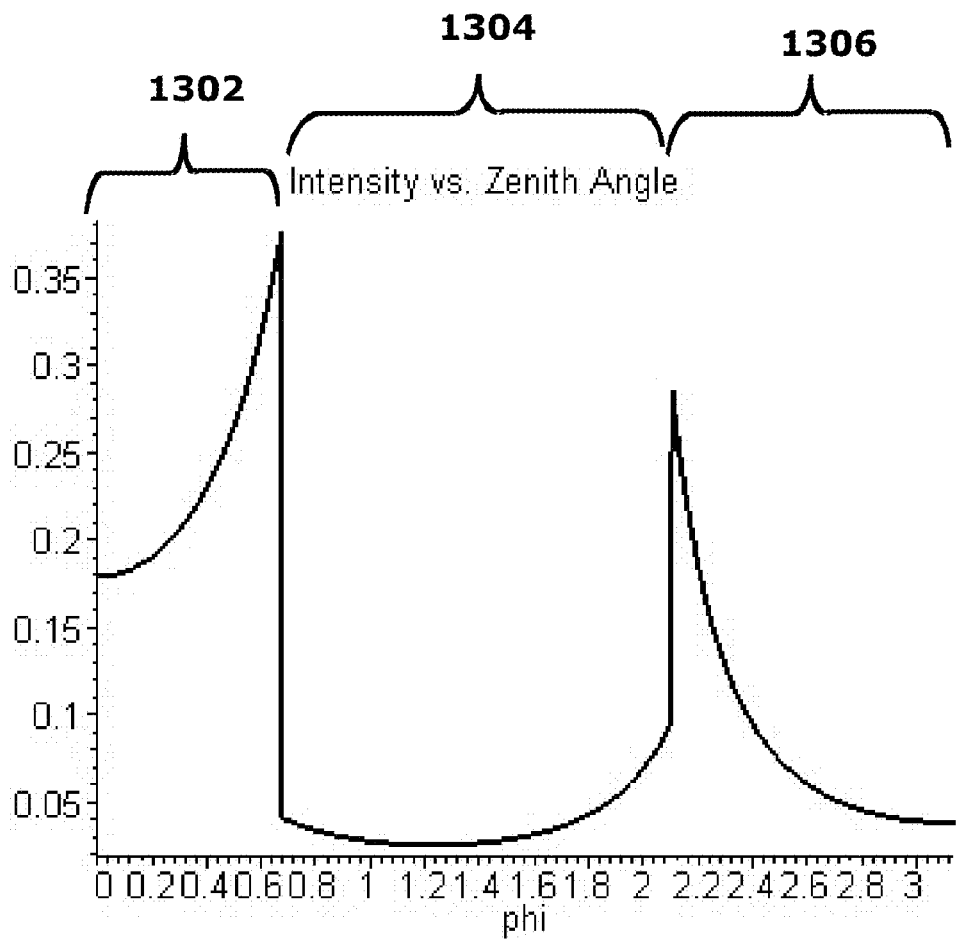
FIG. 13 is a graph including a plot of a light intensity distribution that approximates a distribution produced by an LED light bulb according to an embodiment of the invention.

The lamp 400 provides a light distribution that is especially suited for table lamp and floor lamp applications such as shown in FIG. 1 which have a typical lamp shade. The light distribution provided by the lamp 400 ameliorates the problem of the centrally peak light distribution described above with reference to FIGS. 2-3. FIG. 12 is a schematic representation of a light bulb on which X-Z coordinate axes are superimposed and a zenith angle $\phi$ is identified. As used herein the term longitudinal axis referring to a bulb is the Z-axis shown in FIG. 12. This is the zenith angle of a spherical coordinate system. FIG. 13 shows an approximate light distribution produced by the lamp 400 according to an embodiment of the invention. In FIG. 13 the abscissa gives zenith angle value in radians from 0 to $\pi$ radians (180°) and the ordinate gives intensity in relative units. The upper half of the light distribution shown in FIG. 13 extending from 0 to $\pi/2$ radians (90°) is to be provided by the upper set of LEDs 432 and lenses 434 and the lower half of the light distribution extending from $\pi/2$ radians (90°) to $\pi$ (180°) is to be provided by the lower set of LEDS 424 and lenses 426. The two halves of the light distribution bounded at $\pi/2$ radians (90°) have equal luminous flux so that an equal number of LEDs may be used on the upper and lower MCPCBS 428, 422. (Alternatively different numbers of LEDs are used). A first portion of the distribution 1302 extending from 0 to 0.675 radians (38.7° which will pass through the upper aperture 118 of the lamp shade 114 is proportional to $\cos^{-3}(\phi)$ and is designed to illuminate the ceiling above the lamp 100 relatively uniformly. The $\cos^{-3}(\phi)$ spreads the light uniformly over the 0 to 0.675 radian range and thus is more effective at providing indirect illumination in a room than a conventional light bulb which creates a more centrally peaked distribution out of the top of the lamp shade. 36% of the luminous flux produced by the lamp 400 is in the first portion of the distribution 1302. This is in contrast to about 10% of the light distribution produced by a common household incandescent lamp that would be in the angle zone corresponding to the first portion of the distribution.

A second portion of the distribution 1304 extending from 0.675 radians (38.7° to 2.104 radians (120.6° is designed to uniformly illuminate the lamp shade with a limited portion (30%) of the luminous flux emitted by the lamp 400. In contrast a typical household incandescent lamp emits about 71% of its luminous flux in the angle range 38.7° to 120.6°. Uniformly illuminating the lamp shade with less lumens improves its appearance by reducing bright spots which is especially important for more transmissive lamp shades. Limiting the luminous flux incident on the lamp shade reduces the scattered reflected light which creates the strong centrally peak distribution shown in FIGS. 2-3, which tends to over illuminate the lamp body 104 and accounts for reduced Light Output Ratio (LOR) due to absorption by the shade 114 or the lamp body 104. The second portion of the light distribution 1304 is proportional to:

$$\text{Intensity} := ill(Ztop + \cot(\theta\_s)Rtop)$$

$$\left(-\left((Ztop + \cot(\theta\_s)Rtop)\cos(\phi)\left(\frac{-\sin(\phi) +}{\cot(\theta\_s)\cos(\phi)}\right)\right)\right/$$

$$(\cos(\phi) + \cot(\theta\_s)\sin(\phi))^2 -$$

$$\frac{(Ztop + \cot(\theta\_s)Rtop)\sin(\phi)}{\cos(\phi) + \cot(\theta\_s)\sin(\phi)}\right)\Big/$$

$$((\cos(\phi) + \cot(\theta\_s)\sin(\phi))\cos(\theta\_s))$$

Where, Ztop is the Z coordinate of the top aperture 118 of the lamp shade (refer to coordinate axes indicated in FIG. 12), Rtop is the radius of the top aperture, Theta_s is the angle of surface of the lamp shade relative to the vertical Z-axis (see $\Theta\_s$ in FIG. 1), ill is the uniform illuminance level on the lamp shade, and $\phi$ is the zenith angle as previously described.

Figure 14:
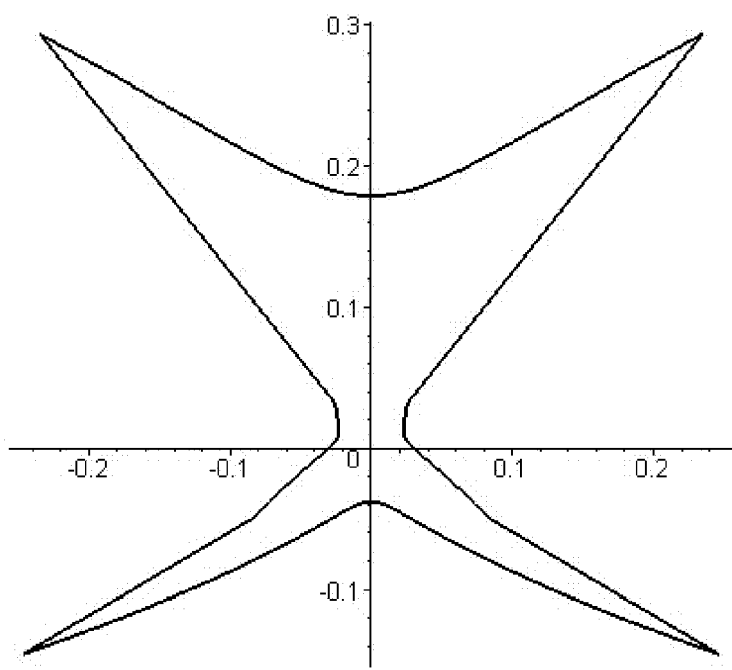
FIG. 14 is a graph including a polar coordinates plot of the light intensity distribution shown in FIG. 13.

A third portion of the light distribution 1306 extending from 2.104 radians (120.6°) to π radians (180°) which corresponds to the angular range subtended by the lower aperture 116 of the lamp shade 114 is approximately proportional to: $\cos^{-3}(\pi-\phi)$. The third portion of the light distribution 1306 includes 36% of the luminous flux emitted by the 400. This is in contrast to the common incandescent lamp which emits about 19% of its luminous flux in the angular range corresponding to the third portion 1306. The third portion of the light distribution 1306 is designed to project a substantially uniform field of light through the lower aperture 116 of the lamp shade 114. In the lamp shown in FIG. 1 this will project an approximately uniform light component out to 100 cm. Even if the lamp 400 was producing only 650 lumens as opposed to 800 lumens which is standard for a 60 watt light bulb, this component alone (not including light from the second portion of the distribution 1304 scattered by the lamp shade 114) would produce an illuminance level of 74 lux out to 100 cm. In contrast the CFL distributions 204, 304 shown in FIGS. 2-3 drop below the 74 lux at about 52 cm and 64 cm respectively, leaving the zone in which a person would likely be making use of light produced by the lamp 100 relatively weakly illuminated. FIG. 14 is a polar plot of the light intensity distribution shown in FIG. 13. As shown in the polar plot distribution is 'X' shaped.

The percentage of flux allocated to each portion of the distribution 1302, 1304, 1306 can be varied relative to the example described above with reference to FIGS. 13-14. According to embodiments of the invention the angular range corresponding to the second portion of the distribution 1304, preferably includes less than 50% of the light flux, and more preferably between 20% and 35% of the total light flux emitted by the LED light bulb. According to certain embodiments of the invention an LED lamp provides a light distribution that has a first local maximum between polar (zenith) angles 25° and 55° a second local maximum between polar (zenith) angles 125° and 150° and includes less than 50% of a total luminous flux in the light distribution between the first local maximum and the second local maximum, and preferably includes between 20% and 35% of its luminous flux between the first local maximum and the second local maxim. In this manner light emitted through the apertures of the lamp shade tends to be more widely and uniformly distributed and light diffusely scattered by the lamp shade which would tend to create a centrally peaked light distribution is limited.

Figure 15:
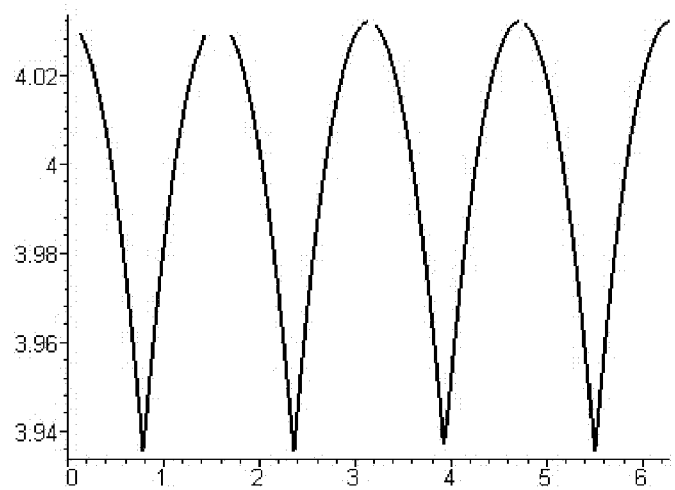
FIG. 15 is a graph including a plot showing minute azimuthal variation in intensity produced by an LED light bulb according to an embodiment of the invention.

For judiciously chosen number of LEDs and dimensioning of the lamp as will be described, the illuminance level produced by the lamp 400 varies only to a minor extent as a function of azimuth angle. Some variation as a function of azimuth angle is due to light redistribution by reflection from the curved surface of the tube 406. Although not shown in FIGS. 4-5, in the interest of azimuthal illuminance uniformity preferably at least 4 LEDs are provided on each of the MCPCBs 422, 428. (If the fan 418 or tube 406 or heat sink 514 does not extend above the upper MCPCB 428, so that there is nothing to reflect light from the upper LEDs 432, the number of LEDs on the upper MCPCB 422, 428 can be more freely chosen, e.g., 1, 2 or 3 LEDs may be used.) If exactly 4 LEDs equally spaced in azimuth angle are provided then it is preferable, in the interest of azimuthal uniformity, that the ratio of the outer radius of the tube 406 to radial distance of the LEDs from the centerline of the tube 406 be equal to $\cos(\pi/4)=0.707$. FIG. 15 shows the azimuthal distribution for such a case. In FIG. 15 the abscissa gives azimuth angle in radians and the ordinate specifies relative intensity. The difference between the maximum intensity and the minimum intensity is only 2%, which is quite negligible for lighting applications. This plot is for the case of a specular tube surface. For a more diffuse surface such as in the case of a painted surface the ripple would be even lower. Alternatively, 8 LEDs including 4 phosphor converted LEDs, alternating in position with 4 red or amber (e.g., 620 nm) LEDs can be provided on each of the MCPCBs. In such an embodiment the azimuthal variation in intensity is sufficiently low that any color (chromaticity coordinate) variations due to the out of phase variation in the light field from the two types of LEDs (due to their azimuthal offset) would be limited.

Figure 16:
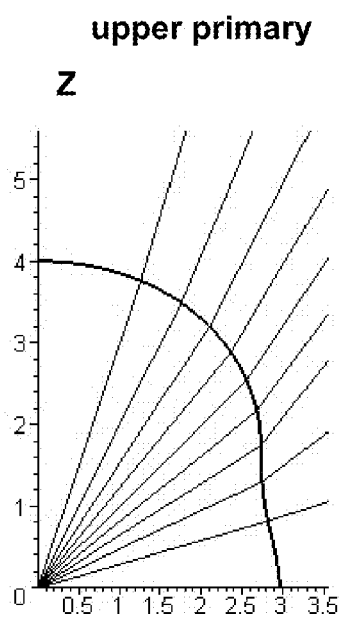
FIG. 16 is a graph including a plot of a generatrix of a surface of an upper primary lens used to produce at least an approximation an upper half of the light distribution shown in FIGS. 13-14.
Figure 17:
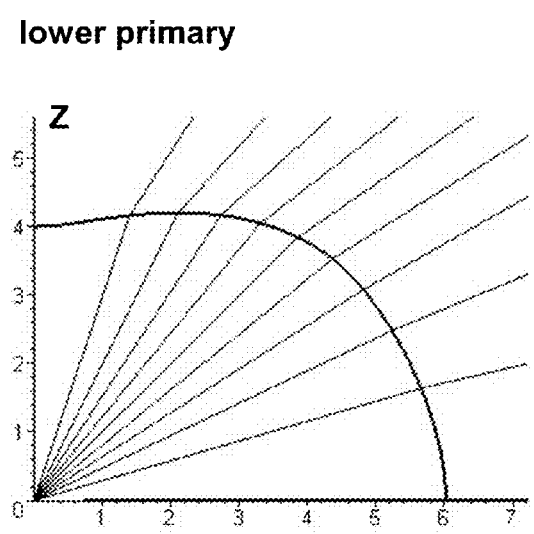
FIG. 17 is a graph including a plot of a generatrix of a surface of an lower primary lens used to produce at least an approximation a lower half of the light distribution shown in FIGS. 13-14.

The optics used to obtain the light distribution shown in FIGS. 13 & 14 is described herein below. FIG. 16 shows a generatrix of the surface of a primary lens for use on the LEDs on the upper MCPCB 428 and FIG. 17 shows a generatrix of the surface of a primary lens for use on the LEDs on the lower MCPCB 422. In both cases the full surfaces of the lenses are obtained by revolving the generatrices about the vertical Z-axes. Lenses with these profiles will generated, at least an approximation of the light distribution shown in FIGS. 13 & 14. The generatrices are given by equation DE3 in the above mentioned U.S. patent application Ser. No. 12/629,698 which is hereby incorporated herein by reference. In both cases the index of refraction of the lenses n1 is equal to 1.5; the input light distribution (rad_in) is the quasi-Lambertian distribution shown by curve 104 of FIG. 1 of the '698 application. In the case of the upper lens shown in FIG. 16, the output light distribution (rad_out) is the first half of the light distribution shown in FIGS. 13 & 14 extending from 0 to π/2 radians. In the case of the lower lens shown in FIG. 17, the output distribution (rad_out) is the second half of the light distribution shown in FIGS. 13 & 14 extending from π/2 to π, BUT used in reverse so that π becomes zero. The reversal is necessary because the lower lens is upside-down in the lamp 100.

Figure 18:
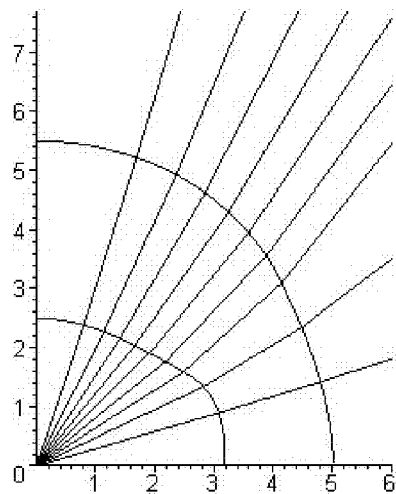
FIG. 18 is a graph including a plot of a generatrices of surfaces of an upper secondary lens used to produce at least an approximation an upper half of the light distribution shown in FIGS. 13-14.
Figure 19:
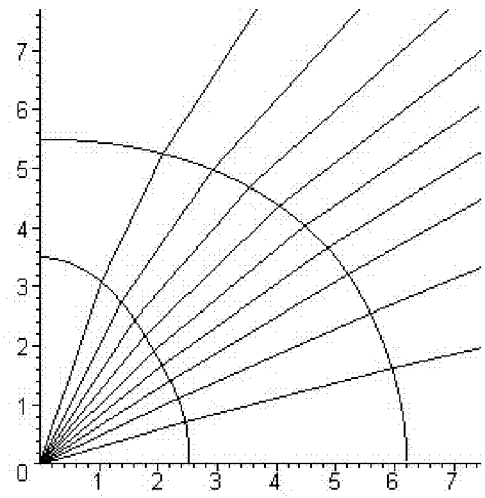
FIG. 19 is a graph including a plot of a generatrices of surfaces of a lower secondary lens used to produce at least an approximation a lower half of the light distribution shown in FIGS. 13-14.

FIGS. 18 & 19 show generatrices of upper 434 and lower 426 secondary lenses that provide a light distribution that at least approximates the distribution shown in FIGS. 13 & 14. The lenses are described by equations DE1 and DE2 of the above referenced pending patent application Ser. No. 13/060,476. The index of refraction of these lenses (n2) is equal to 1.497 which is the index of refraction of PMMA. The input and output light distributions (rad_in, rad_out) are the above mentioned quasi-Lambertian distribution and the distributions derived from that shown in FIGS. 13 & 14 as described above in connection with the primary lenses shown in FIGS. 16 & 17.

As shown in FIG. 13 the light intensity distribution is discontinuous (abruptly jumps in level) at the boundaries between the second portion 1304 and the first portion 1302 and third portion 1306 (although the plotting routine shows two vertical lines at the boundaries). In practice due to the finite size of the LED dies used in the LEDs 424, 432 the light intensity distribution will not be discontinuous, there will be a smooth transition between zones. This is OK and in fact desirable. According to certain embodiment of the invention a transition zone of 7° to 15° is added between the second portion 1304 and the first portion 1302 and the third portion 1306. The transitions may for example be a simple linear sloped portion of the light distribution.

Light in the second portion of the distribution 1304 that is either diffusely transmitted or diffusely reflected by the lamp shade 114 may be incident in the zone covered by the first portion of the distribution 1302 (e.g., the ceiling) or the zone covered by the third portion of the distribution 1306 (e.g., a table top or area in which a person seated next to the lamp would be holding a book.). Such diffuse light will alter the illuminance such that it deviates from the uniform distribution provided by the first and third portions of the distributions, 1302, 1306. Both the '698 and '476 patent applications provide refined lens surfaces that are obtained by feeding back a deviation from an intended light distribution into the lens equations, and according to certain embodiments of the invention such refined lens surfaces may be used to compensate for the uniformity disrupting effect of light scattered by the lamp shade. In doing so one may conveniently measure illuminance at a task plane or on a ceiling, and then convert illuminance to luminous intensity for feeding back into the equations.

The distribution shown in FIGS. 13 & 14 has zenith angle boundaries between the three portions 1302, 1304, 1306 based on the zenith angle coordinates of bottom aperture 116 and top aperture 118 of the lamp shade 114 shown in FIG. 1. Lamp shades vary in dimensions such that zenith angle coordinates of the apertures vary and the angle of the side of the lamp shade theta_s varies. In some cases the side of the lamp shade is curved rather than conical. To address the variation one possibility is to take a sampling of lamp shades used in a particular market (e.g., the United States) and use average values of the zenith coordinates of the apertures and theta_s. Another possibility is customize the lamp 400 for particular table lamps and floor lamps. The latter approach is appropriate if, for example, lamps 400 are to be supplied to a large hotel chain which needs a large number of identical table lamps or floor lamps. Customizing is more attractive because the LED lamp 400 can be designed to have a very long life and be reparable.

An alternative approximate light distribution for the LED lamp is given by:

shaped MCPCB 422. A second of the power supply output wires 512 passes through a hole 538 in the lower annular shaped MCPCB 422, through an axial hole 540 in the collar clamp 414, through a hole 542 in the upper MCPCB and into one of the connectors 536 on the upper MCPCB. A separate wire 544 completes the circuit to power the LEDs by connecting the remaining connector 524 on the lower MCPCB 422 and the remaining connector 536 on the upper MCPCB 428. The LEDS on the two MCPCB 422, 428 will thus be connected in a single series chain. The separate wire 544 passes through a second hole 546 in the lower MCPCB 422, through a second hole 548 in the collar clamp 414, through a hole 550 in the upper MCPCB 428. The fan 418 has a harness 552 that passes through the heat sink 514 and connects to a mating connector 554 on the power supply 508. Alternatively the harness 552 can connect to a surface mount connector on the upper MCPCB 428.

Figure 6:
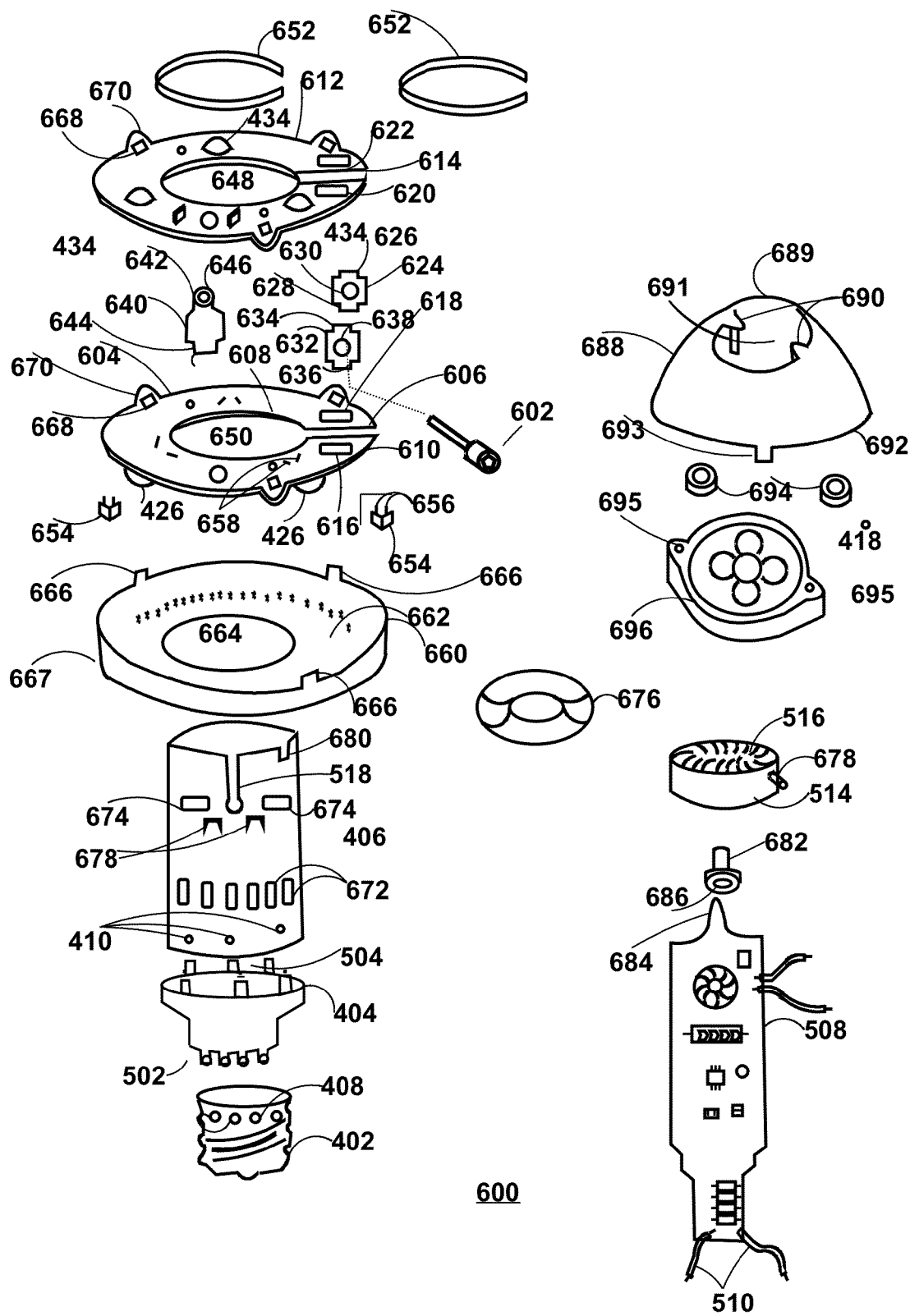
FIG. 6 is an exploded view of an even less expensive variation on the first embodiment shown in FIGS. 4-5.
Figure 20:
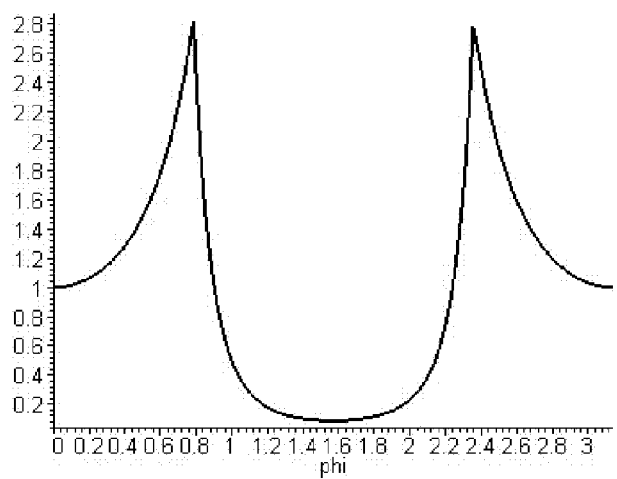
FIG. 20 is a graph including a plot of a light intensity distribution that approximates a distribution produced by an LED light bulb according to an alternative embodiment of the invention.
Figure 21:
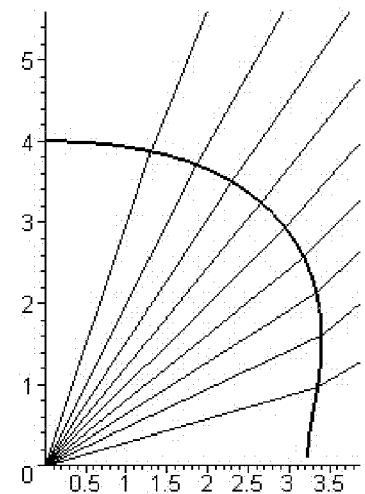
FIG. 21 is a graph including a plot of a generatrix of a surface of a primary lens used to produce at least an approximation the light distribution shown in FIG. 20.

FIG. 6 is an exploded view of an even less expensive variation on the first embodiment shown in FIGS. 4-5. The design shown in FIGS. 4-5 includes the collar clamp 414 which would typically by made my machining, and although it could be made by bar feeding an extrusion into a machining center capable of six-sided machining and thus by made automatically, one still must consider the machining time and the expensive of the material (e.g., aluminum) used to make it. Weight of the collar clamp is also a consideration. The design shown in FIG. 6 eliminates the collar clamp and in lieu of the multiple screws 522, 526 used to secure the MCPCB's 422, 428 there is only a single screw 602 for the assembly worker to turn.

$$\text{Intensity } 3 := \begin{cases} \dfrac{1}{\cos(\phi)^3} & \phi < .2500000000\,\pi \\ .08838834765 \dfrac{1}{\sin(\phi)^{10}} & .2500000000\,\pi - \phi \leq 0 \text{ and } \phi - .7500000000\,\pi < 0 \\ \dfrac{1}{\cos(-3.14159 + \phi)^3} & .7500000000\,\pi \leq \phi \end{cases}$$

and shown in FIG. 20. The distribution is symmetric about π/2 so that the same lens can be used on the upper MCPCB 428 and the lower MCPCB 422. The first and third zones of the distribution correspond roughly to the upper 118 and lower 116 apertures of the lamp shade 114 while the middle zone is meant to illuminate the lamp shade 114 itself. The distribution has a first local maximum at π/4 and a second local maximum at (¾)π. The middle zone includes 24.5% of the luminous flux and the first and third zones evenly split the remaining 75.5%. A generatrix of a lens with index n=1.5 for producing one-half (e.g., upper or lower) of the distribution shown in FIG. 20 and given above is shown in FIG. 21.

Referring again to FIGS. 4-5, the fan 418 is provided with a cover 436 that fits around the outside of the fan. The cover is suitably made of reflective material such as white plastic or stamped reflective metal, e.g., aluminum or silver plated copper or aluminum. A set of four screws 438 passes through the cover 436, through mounting holes of the fan 418 and into threaded holes 534 in the upper MCPCB 428. Two additional insulation displacement, surface mount connectors 536 are mounted on the upper MCPCB 428. In passively cooled embodiments in which the fan 418 is not used, the tube 406 and the heat sink 514 can be extended further upward beyond the upper MCPCB 428.

A first of the power supply output wires 511 connects to one of the surface mount connectors 524 on the lower annual Referring to FIG. 6, the lamp LED light bulb 600 includes a lower MCPCB 604 that includes a through slot 606 that extends from an ID 608 through to an OD 610 creating a gap. The bulb 600 also includes an upper MCPCB 612 that similarly includes a through slot 614 that extends from its ID to its OD creating a gap in the upper MCPCB 612 as well. On the lower MCPCB 604 there is first clamping aperture 616 on one side (foreground side in the perspective of FIG. 6) of the through slot 606 and second clamping aperture 618 on the opposite side of the through slot 606. Similarly on the upper MCPCB there is a first clamping aperture 620 on the foreground side of the through slot 614 and second clamping aperture 622 on the far side of the through slot 614.

A stamped spring nut 624 includes an upper tongue 626 and a lower tongue 628 and a thread engaging hole 630. The upper tongue 626 of the nut 624 engages in the clamping aperture 622 on the far side of the through slot 614 of the upper MCPCB 612. The lower tongue 628 of the nut 624 engages in the clamping aperture 618 on the far side of the through slot 606 of the lower MCPCB 604. A stamped spring washer 632 (similar in design to the nut 624) includes an upper tongue 634 a lower tongue 636 and a through hole 638. The upper tongue 634 of the washer 632 engages in the clamping slot 620 on the near side of the through slot 614 of the upper MCPCB. The lower tongue 636 of the washer 632 engages in the clamping aperture 616 on the near side of the through slot 606 of the lower MCPCB.

A fitting 640 includes a small diameter upper end 642, a small diameter lower end 644 and a through hole 646 which can serve as a wire feed through to bring two wires to the upper MCPCB. The small diameter upper end 642 fits into a punched hole 648 in the upper MCPCB 612 and the small diameter lower end 644 fits into a punched hole 650 in the lower MCPCB 604.

Thermal interface material (TIM) strips 652 fit between the ID's 608 of the upper and lower MCPCBs 604, 612 and the tube 406. The thermal interface material can be a paste, a film, or a metal shim, e.g., an indium metal shim. Alternatively a metal-to-metal interface joint without a TIM is used.

An external corner (e.g., 90°) specular mirror 654, which is suitably made of silver plated sheet metal is fitted between lenses 426 on the lower MCPCB and the tube 406. These mirrors 654 serve to prevent the tube from retro reflecting a small portion of light back through the lenses 426. The mirrors 654 include tabs 656 that fit through slots 658 in the lower MCPCB 604. To save expense these mirrors 654 may be dispensed with.

A lower diffuser 660 fits under the lower MCPCB 604. The lower diffuser 660 includes a relatively flat disk shaped portion 662, a central hole 664 in the flat disk shaped portion through which the tube 406 is inserted, an upwardly extending cylindrical skirt portion 667 extends upward from the OD of the flat disk shaped portion 662. Cantilevered catch arms 666 extending upward from the cylindrical skirt portion 667 engage in punched slots 668 located in ears 670 at the perimeter of the lower MCPCB 604. Alternatively, catch arms are designed to engage the OD of the lower MCPCB and the slots 668 and the ears 670 are eliminated, however in this case a more complicated injection mold with some action may be necessary or alternatively it may be necessary to have holes in the diffuser 660 through which parts of the mold used to form the catch arms withdraw when the mold opens. It may be possible make due with a simple mold but the grip of the catch arms may be weakened in this case. Alternatively the periphery of the lower MCPCB can be provided with a cammed shape and lower diffuser 660 can snap lock into position by rotation. The shape of the lower diffuser 660 can be varied considerably from what is shown. For example the flat disk portion 662 can be drooped down between the central hole 664 and the OD of the lower diffuser 660.

Rather than having punched louvers 412 the lamp 600 includes punched slots 672 oriented parallel to the longitudinal axis (coincident with Z-axis of FIG. 12) of the lamp 600. Additionally large oval punched out openings 674 are located below where a bottom end of the heat sink 514 will be located when the lamp is assembled. A baffle 676 in the shape of a flattened ¼ section of a toroid (in particular the lower inner ¼ section) which is suitably made my metal stamping or injection molding but may be made by other processes is supported on punched in tabs below the heat sink 514. The baffle allows for large direct air flow through the large opening 674 into the heat sink 514 while preventing wayward fingers from reaching the power supply 508. Alternatively a greater number of smaller holes are provided in lieu of the punched out openings 674 and no baffle 676 is used.

A roll pin 678 is inserted into a drilled hole near the top of the outside cylindrical wall of the heat sink 514. The roll pin 678 locates in a punched out notch 680 at the top end of the tube 406.

A plug 682 fits at the center of the heat sink 514. The plug 682 restricts air flow produced by the fan 418 to passing between the fins 516 and not the center of the heat sink 514. As shown in FIG. 6 the power supply printed circuit board 508 includes an upward extending tongue 684. The plug 682 includes a rectangular recess 686. When the lamp 600 is assembled the tip of tongue 684 locates in the rectangular recess 686 helping to positively located the power supply printed circuit board 508.

An upper diffuser 688 has a rounded shape and includes a top opening 689 through which air passes to cool the lamp 600. The opening 689 includes two inwardly extending ears 690 each of which includes a depending pin 691. A lower outer rim 692 of the upper diffuser 688 includes depending catch arms 693 (one visible in FIG. 6) that engage in slots 668 of the upper MCPCB 612. Two elastomeric washers 694 fit onto the two pins 691 and the two pins 691 insert into holes 695 of a frame 696 of the fan 418. The elastomeric washers 694 hold the fan 418 into position on the upper MCPCB 612.

When the lamp 600 is assembled the upper and lower MCPCBS 612, 604 are brought together with the small diameter ends 642, 644 of the fitting in respective holes 648,650 and the tongues 626, 628, 634, 636 of the nut 624 and washer 636 engaged in respective clamping apertures 616,618, 620, 626 and the screw inserted through the washer 636 and is threaded a couple turns into the nut 624 but not yet tightened. The foregoing assembly is slipped over the tube 406 and the screw tightened bringing the ID's of the MCPCB's 404, 612 into intimate contact with the tube 406 (or TIM strips 652, if used), and at the same time urging the inside of the tube 406 firmly into contact with the outside of the heat sink 514, thereby fostering heat transfer from the MCPCB's to the heat sink 514 and the tube 406 from which the heat can be dissipated to the surrounding air. A TIM may also be used between the tube 406 and the heat sink 514.

The tube may be anodized or painted. The painted is preferably chosen that has a high reflectivity for visible light and high emissivity. The area of the tube which engages the heat sink 514 and the MCPCB's 604,612 may be left free of paint by masking the top end of the tube with a plastic cap prior to painting. Alternatively in the case of paint or coating that has high thermal conductivity, e.g., a paint with a high loading of inorganic particles, masking may not be necessary.

In certain table lamps and floor lamps, particularly those that use two light bulbs, the light bulbs are sometimes oriented horizontally. If the lamps described above with reference to FIGS. 4-6 are adapted with optics that are specifically designed for use in table lamps where the light bulbs are oriented vertically, they would be suboptimal when used in table lamps where the light bulbs are oriented horizontally.

Figure 7:
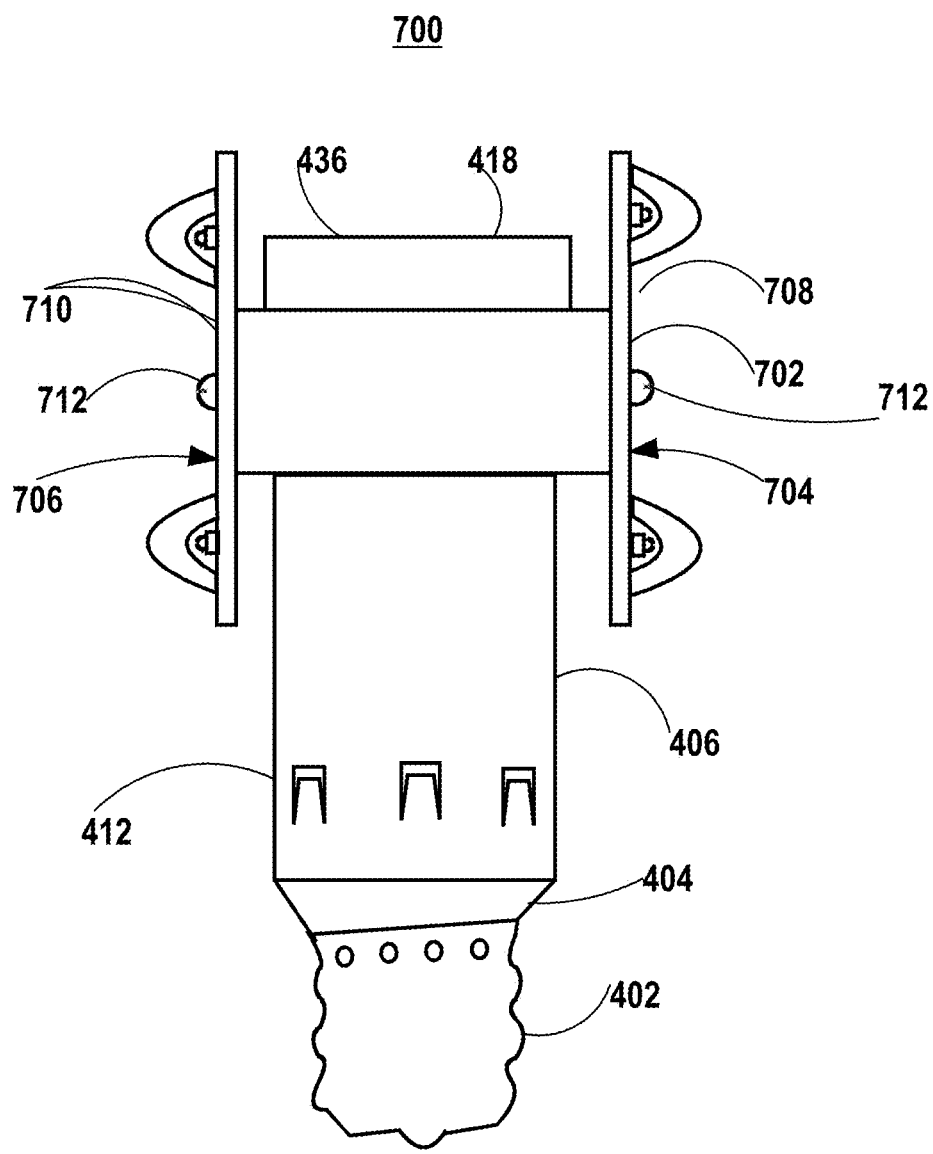
FIG. 7 is a side elevation view of a light bulb according to a second embodiment of the invention which is suitable for use in lamps in which the light bulbs are oriented horizontally as opposed to vertically.
Figure 8:
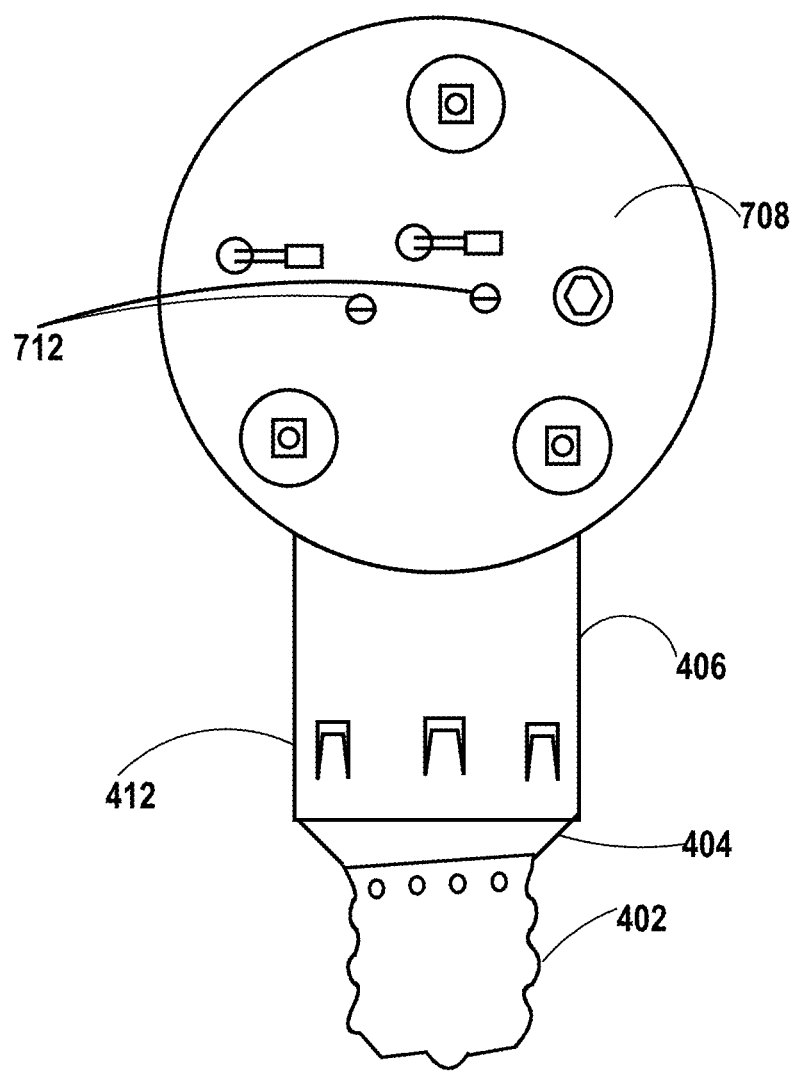
FIG. 8 is a front elevation view of the light bulb shown in FIG. 7.
Figure 9:
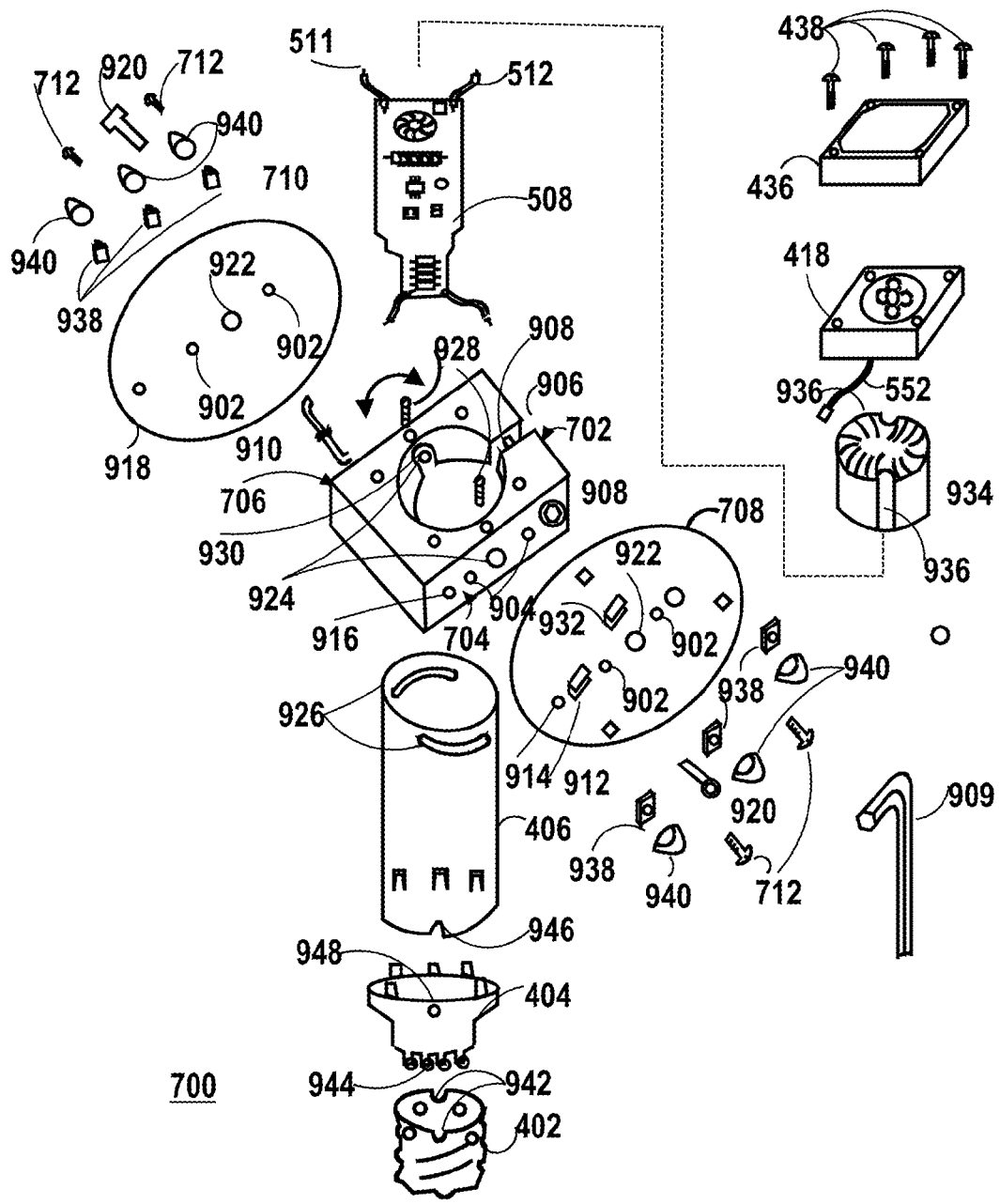
FIG. 9 is an exploded view of the light bulb shown in FIGS. 7-8.

FIGS. 7-9 show an LED based A-lamp 700 that is suitable for use in table lamps or floor lamps where the light bulb is oriented horizontally. In FIGS. 7-9 like parts are assigned like reference numerals to those used in the FIGs. Described above, and the description of those parts will not be repeated. The lamp 700 includes a collar clamp 702 that has a different form compared to the collar clamp 414 described above. The collar clamp 702 has two flat surfaces 704, 706 that face in two opposite directions both of which are perpendicular to the longitudinal axis of the lamp 700. A first circular MCPCB 708 mounts on the first surface 704 and a second MCPCB 710 mounts on the second surface 706. Accordingly, the MCPCB's 708, 710 also face in opposite directions perpendicular to the longitudinal axis of the lamp. The MCPCB's 708, 710 are secured by screws 712, that pass through holes 902 in the MCPCB's 708, 710 and into threaded holes 904 in the collar clamp 702.

The collar clamp 702 includes a through slot 906 and a machine screw 908 passes from one side of the collar clamp across the through slot 906 into a threaded hole (not visible) on the opposite side of the through slot. The machine screw 908 is used to tighten the collar clamp on the tube 406 which in turn tightens the tube 406 against a heat sink 934. An Allen wrench 909 is provided with the lamp 700 to tighten an loosen the machine screw 908.

An interconnection wire 910 passes from a surface mount connector 912 on the first MCPCB 708, through a hole 914 in the first MCPCB 708, through a hole 916 in the collar clamp 702, through a hole 918 in the second MCPCB 710 to a similar surface mount connector (not visible) on the second MCPCB 710.

When the lamp 700 is assembled a first wire protection ferrule/motion stop 920 (which may be a turned part) is positioned through a hole 922 in the second MCPCB 710, through a hole 924 in the collar clamp 702 and through an azimuthally oriented slot 926 in the tube 406. A first output wire 511 of the power supply 508 passes through the wire protection ferrule/motion stop 920 and connects to a surface mount connector (not visible) on the second MCPCB 710. The wire protection ferrule/motion stop is held in position by a set screw 928. An axial slot 930 in the ID of the collar clamp 702 which intersects with the hole 924 prevents binding of the wire 511 on the tube 406 when the collar clamp 702 is slipped over the tube 406. While the axial slot extends up from a bottom end of the collar clamp 702 in need only extend up as far as the hole 924. The same arrangement is provided for the first MCPCB 708 and the same reference numerals are used to label the elements. The surface mount connector 932 to which the second output wire 512 connects on the first MCPCB is visible in FIG. 9. The heat sink 934 features external axial slots 936 through which the output wires 511, 512 run before turning into the ferrules 920 and passing through to the MCPCBs 708, 710.

A plurality of LEDs 938 mount on the MCPCBs 708, 710 and a plurality of lenses 940 mount over the LEDs 938. As shown in FIG. 9 the slots 926 allow for at 90° of rotation, which means that no matter what the orientation of the lamp 700 when it is screwed into an Edison socket, the collar clamp 702 can be turned so that one MCPCB 708, 710 faces directly up through the top aperture 118 of the shade 114 and one faces directly down through the bottom aperture 116 of the shade 114. For this embodiment the light distribution shown in FIG. 13, 14 can be modified so that it is symmetric about $\pi/2$ by making the bound between the first portion and the second portion and bound between the second portion and the third portion equally spaced from $\pi/2$, e.g., by an angle between 40° and 60°, and by setting theta_s equal to zero, in which case the expression describing the second portion of the intensity distribution simplifies to $\alpha \cdot \sin^{-3}(\phi)$, where alpha is constant factor adjusted to obtain a desired fraction of luminous flux in the second zone. Alternatively only a single annular slot 926 which provides at least 180° of rotation of the collar clamp 702 is provided and both output wires 511, 512 are fed through a single ferrule 920 and two wires in lieu of single wire 910 are used to connect the MCPCB that is supplied through the single ferrule to the remaining MCPCB. In this alternative the same lenses as described above may be used, because the consumer will be able to rotate the MCPCB's so that the lenses intended to face up face up.

As shown in FIG. 9 the Edison screw base 402 has a pair of notches 942 in its upper edge, and the coupling piece 404 includes protrusions 944 (one of which is visible) that engage in the notches 942 and assist in transmitting torque from the coupling piece 404 to the Edison base 402 when the lamp 700 is screwed and unscrewed from the Edison base. Similarly the lower end of the tube 406 has a notch 946 in which a protrusion 948 in the top of the coupling piece 404 engages.

Figure 10:
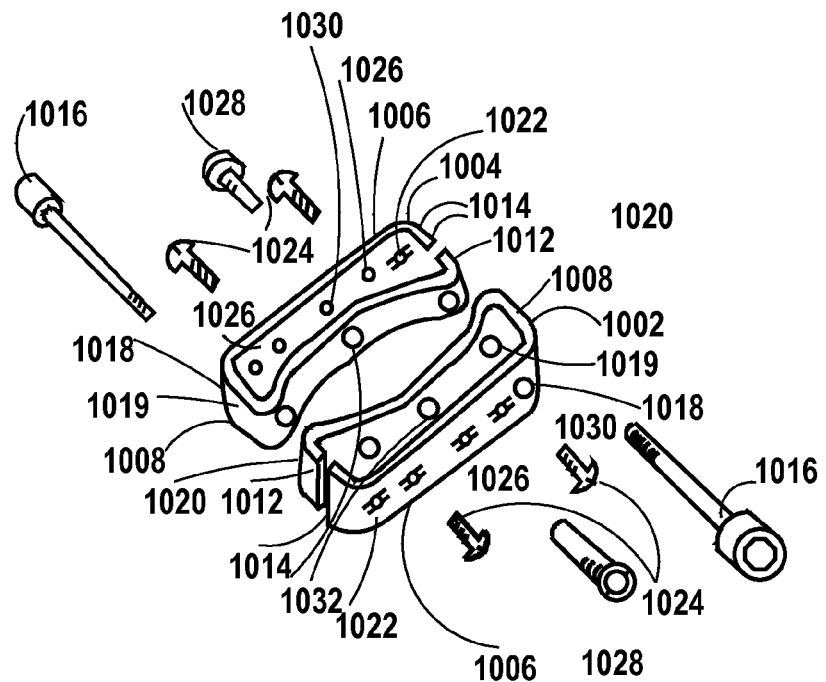
FIG. 10 shows a two-piece stamping alternative to a machined collar used in the embodiment shown in FIGS. 7-9.

FIG. 10 shows a two piece 1002, 1004 stamped metal alternative to the collar clamp 702 used in the lamp 700 shown in FIGS. 7-9. An advantage of the two piece stamped alternative is that it is low cost, low weight and less obstructing of natural convection air flow on the back sides of the MCPCBS 708, 710 and tube 406. The first piece 1002 and the second piece 1004 may be identical. Each is made up of a strip of metal that may for example be 5 to 20 mm wide. Referring to the first piece 1002 it comprises a flat front segment 1006. A right hand segment 1008 connects to the front segment 1006. The right hand segment 1008 extends generally perpendicular to the front segment. A rear concave arcuate segment 1010 extends from the right hand segment 1008 adjacent and substantially coextensive with the front segment 1008. From the left of the arcuate segment 1010, a first left side segment 1012 extends toward the front segment 1006 and from the left of the front segment 1006, a second left side segment 1014 extends toward the arcuate segment 1010. Ends of the two left side segments 1012, 1014 which are the ends of the strip from which each piece 1002, 1004 are formed meet at a plain butt joint. Alternatively another type of arrangement is utilized where the ends meet.

A pair of clamping screws 1016 pass through a first hole 1018 in the front flat segment 1006, a second hole 1019 in the arcuate segment 1010, a third hole 1020 on the opposite side of the arcuate segment 1010 of the opposing collar clamp 1002 or 1004 and into a thread engaging hole 1022 in the front flat segment 1006. Although as shown the front segments 1006 are shown and described as flat, which would be the shape when the lamp 700 is in use and the clamping screws 1116 secured, when unstressed the front segments 1006 may have a convex bowed shape, such that when clamped the strain in the clamp pieces 1002, 1004 causes pressure between the front segment 1006 and the MCPCB 708, 710 to be more evenly distributed, as is know in the art of statics. Similarly the arcuate segments 1010, when in an unstressed free condition may have a radius of curvature that is larger than the radius of curvature of the tube 406 against which they will be clamped. This will also tend to more evenly distribute bearing force between the clamp pieces 1002, 1004 and the tube 406. Suitable materials for the clamp pieces include but are not limited to beryllium copper, phosphor bronze, or spring steel. Either of both of the clamping screws 1016 may be loosened and tightened for the purpose or reorienting the MCPCBs 708, 710.

A pair of MCPCB 708, 710 clamping screws 1024 thread into thread engaging holes 1026 on each front flat segment 1006. The MCPCB's 708, 710 are not shown in FIG. 10. A wire protection ferrule/motion stop 1028 threads into central thread engaging hole 1030 in each front segment 1006 and through a central through-hole 1032 in each arcuate segment 1010. The ferrule/motion stops 1028 then pass into the azimuthal slots 926 of the tube 406 shown in FIG. 9.

FIG. 11 shows a directional lamp 1100 according to an embodiment of the invention. The directional lamp includes a single MCPCB 1102 mounted facing up on the top of the collar clamp 414. The MCPCB 1102 has a wavy edge 1104 to assist in gripping and screwing in the lamp 1100. A pair of LEDs 1106 mount on the MCPCB 1102 A pair of lens holders 1108 mount to the MCPCB around the LEDs 1106. The lens holder 1108 are secured to the MCPCB by screws 1110 that pass through holes 1112 in flanges 1114 of the lens holders 1108. A pair of lenses 1116 are secured by the lens holders 1108 over the LEDs 1106. Alternatively rather than using the clamp collar 416, the arrangement shown in FIG. 6 with a dummy plate serving in place of the lower MCPCB will be used in the directional lamp 1100.

In the LED light bulb 400 the cooling fan 418 is mounted to the top MCPCB 428 using a set of mounting screws 438. FIG.

22 shows an exploded view of an LED light bulb 2200 that includes an alternative design for mounting a cooling fan 2202. A tube 2204 of the light bulb 2200 includes six L-shaped slots 2206 extending first axially from an upper end 2208 of the tube and then turning and extending azimuthally. A power supply circuit board not shown in FIG. 22 would be located in the tube as in the case of LED light bulbs 400, 600. A cylindrical heat sink 2210 which includes a plurality of parallel fins 2212 is inserted into the tube 2204 and clamped in position when machine screw 602 is tightened clamping the MCPCBS 610, 612 around the tube 2204. A first O-ring 2214 (alternatively a gasket) is placed in position at a circumference of the top of the cylindrical heat sink 2210. The fan 2202 which has a cylindrical frame is placed on the first O-ring 2214, such that the cylindrical frame engages the first O-ring. A second O-ring 2216 (alternatively a gasket) is placed on the fan 2202 such that the second O-ring 2216 engages the cylindrical frame of the fan 2202. A locking ring 2218 that includes a plurality of outwardly extending radial projections 2220 is engaged in the L-shaped slots 2206 by first pushing down and then turning the locking ring 2218. Edges of cylindrical frame of the fan can be tapered inward, e.g., conical, so that the fan tends to center in the O-rings 2214, 2216. FIG. 24 is a side view of the fan 2202 showing upper 2402 and lower 2404 conical edges. When the locking ring 2218 is engaged the fan 2202 will be supported between the two O-rings 2214, 2216. This tends arrangement prevents the body of the light bulb 2200 from acting as antenna for radiating noise due to minute vibrations of the fan 2202. Using the locking ring 2218 to mount the fan is easier for an assembly worker compared to screwing in four small screws. A dust filter 2222 is placed in the end of the tube 2204 over the locking ring. FIG. 23 shows a T-handle tool 2300 that can be used to engage the locking ring 2218. The tool 2300 includes a T handle 2302 attached to a main body which includes an inner cylinder 2304 surrounded by an outer tube 2306. The outer tube 2306 fits around the tube 2204 of the LED light bulb 2200, while the inner cylinder fits in the tube 2204 and pushes the locking ring 2218 downward. The outer tube 2306 includes an number of axial slots 2308 that engage the projections 2220 of the locking ring 2218. After the locking ring 2218 is pushed down against the resiliency of the O-rings 2214, 2216 using the tool 2300 it is rotated so that projections 2220 come to rest in the azimuthally extending portions of the L-shaped slots 2206. Then the tool 2300 is removed. Thus the fan 2202 can be locked into position by an assembly worker using a few swift actions (Therbligs).

Figure 25:
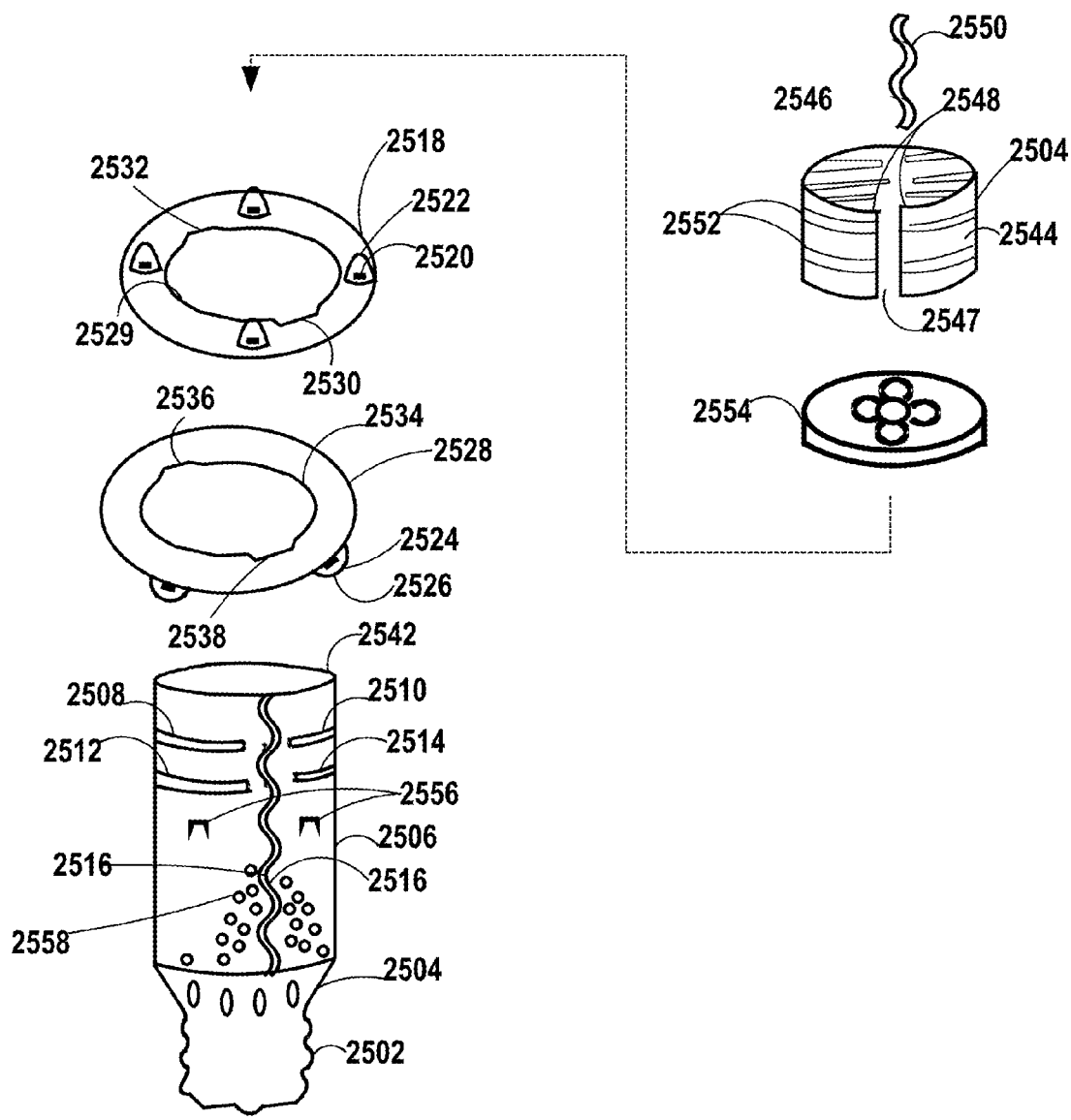
FIG. 25 is an exploded view of an LED light bulb according to another embodiment of the invention, which is a further evolution of the design shown in FIG. 6.

FIG. 25 is an exploded view of an LED light bulb 2500 according to another embodiment of the invention. The design 2500 shown in FIG. 25 is a further evolution of the design shown in FIG. 6. The slots 606, 615, clamping apertures 616, 618, 620, 622, screw 602, nut 624 and washer 634 used in the embodiment shown in FIG. 6 are eliminated. Referring to FIG. 25, the LED light bulb 2500 comprises an Edison base 2502 connected to a funnel shaped housing connecting part 2504 that connects to a tubular housing 2506. As shown the tubular housing 2506 is made by forming sheet metal into a tubular shape, but may alternatively be drawn, cast, extruded or made in other ways. The tubular housing 2506 comprises an upper pair of azimuthally oriented slots 2508, 2510 and a lower pair of azimuthally oriented slots 2512, 2514. On the front side (visible in the drawing) it is seen that ends of the slots 2508 and 2510 and the ends of slots 2512 and 2514 are separated azimuthally so that the slots are distinct. On the back side (not visible in the drawing) the ends of the slots 2508 and 2510 and the ends of slots 2512 and 2514 may also separated. Serpentine edges 2516 of sheet metal forming the tubular housing extend vertically from top to bottom between the ends of the slots 2508, 2510, 2512, 2514.

Four LEDs 2520 with lenses 2522 are mounted facing up on an upper MCPCB 2518. Four LEDs (two visible) 2524 with lenses 2526 are mounted facing down on a lower MCPCB 2528. The lenses 2522, 2526 may be of the types described above with reference to FIGS. 16-19. When the LED light bulb 2500 is assembled an inside diameter (ID) 2529 of the upper MCPCB 2518 will be positioned in the upper pair of azimuthally oriented slots 2508, 2510. A front relief cut 2530 and a back relief cut 2532 which are cut into the ID 2529 accommodate portions of the tubular housing 2506 located between ends of the upper azimuthally oriented slots 2508, 2510. Similarly, the lower MCPCB 2528 has a circular ID 2534 that is positioned in the lower pair of azimuthally oriented slots 2512, 2514 and also has analogous relief cuts 2536, 2538 to accommodate portions of the tubular housing 2506 located between ends of the lower azimuthally oriented slots 2512, 2514.

A cylindrical heat sink 2540 is inserted into a top end 2542 of the tubular housing 2506. The cylindrical heat sink 2540 has an cylindrical outside wall 2544 and inwardly extending fins 2546. The cylindrical outside wall 2544 includes a gap 2547. Seats 2548 for a serpentine leaf spring 2550 are formed on either side of the gap 2547. The serpentine leaf spring 2550 is inserted into the heat sink 2540 and rests in the seats 2548. A pair of shallow circumferential grooves 2552 are located on the cylindrical outside wall 2544. When the heat sink 2540 is inserted into the tubular housing 2506 the ID's 2529, 2534 of the annular MCPCB's 2518, 2528 will contact the shallow circumferential grooves 2552. Contact pressure will be maintained by the serpentine leaf spring 2550. The ID's 2529, 2534 can be machined when the MCPCB's 2518, 2528 are still part of a larger MCPCB panel from which they are made. The heat sink 2540 can be machined from long lengths of extruded stock that is fed through a machining center equipped with a bar feeder. Thus, in regard to both the MCPCBs 2518, 2528 and the heat sink set up of individual parts for machining is avoided. In the same vein the tubular housing 2506 can be formed in a progressive die that operates on a continuous coil of sheet metal stock. Thus the parts of the LED light bulb 2500 are well adapted for mass production. The ID's 2529, 2534 can be machined using a boring head or an end mill. The shallow grooves 2552 can be turned in a machining center prior to cutting a slot to define the gap 2547. The relief cuts 2530, 2532, 2536, 2538 can be machined with an end mill or broach for example. A thermal interface material may be used between the ID's 2529, 2534 and the heat sink 2504, or the interface may be bare metal-to-metal. It should be noted that the design shown in FIG. 25 provides a direct thermal interface between the MCPCBS 2518, 2528 and the heat sink 2504, whereas in other embodiments described above heat must pass through thermal interfaces into and out of the tubular metal housings before reaching the heat sinks. Additionally, the embodiment shown in FIG. 25 eliminates the threaded fasteners used to secure the MCPCBs in embodiments described above. Thus the design shown in FIG. 25 is simplified meaning it would tend to be lower cost in terms of parts and the cost of labor for assembly. It would also eliminate unsightly hardware.

A fan 2554 is disposed in the tubular housing 2506 below the heat sink 2540. The fan 2554 is positioned by tabs 2556 that are punched in the tubular housing 2506 and act as position stops. The funnel shaped part 2504 includes ventilation holes 2560 and an array of ventilation holes 2558 is provided in the tubular housing 2506 to supply air to the fan 2554. Note that the portion of the array of ventilation holes 2558 shown in FIG. 25 is arranged in a triangular pattern that is centered azimuthally between two of the downward facing LEDs 2524. As will be discussed further below, with reference to FIGS. 27-29, the arrangement of the ventilation holes 2558 is designed to minimize loss of light from the downward facing LEDs 2524 into the ventilation holes 2558.

Figure 26:
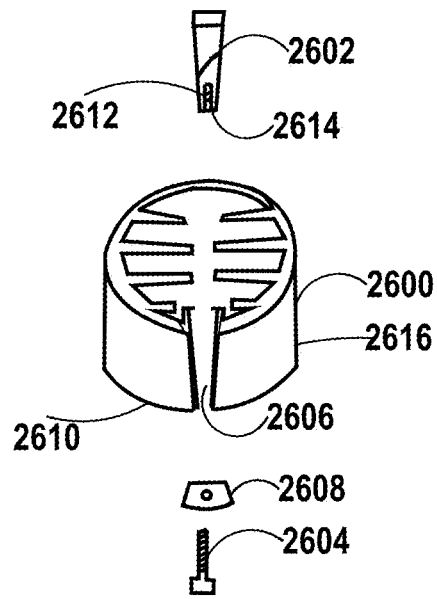
FIG. 26 shows an alternative heat sink, with an associated clamping wedge and screw that may be used in the LED light bulb shown in FIG. 25, for example.

In the embodiment shown in FIG. 25 because the heat sink 2540 directly contacts the MCPCBs 2518, 2528, alternatively in lieu of a metal tubular housing 2506, a material with lower thermal conductivity such as plastic may be substituted. If plastic is used the upper part of the housing which was constituted by the metal tubular housing 2506 could be integrally molded with what was the funnel shaped housing connecting part 2504. Such a housing may be tapered along a substantial portion of its length FIG. 26 shows an alternative heat sink 2600, with an associated clamping wedge 2602 and screw 2604 that may be used in the LED light bulb shown in FIG. 25, for example. The clamping wedge 2602 fits into a tapered gap 2606. The screw 2604 provided with a spring washer 2608 that seats on a bottom end 2610 of the heat sink 2600 and threads into a threaded hole 2612 that is located in a bottom (narrow) end 2614 of the clamping wedge 2602. The clamping wedge 2602 is depicted partially cut away to reveal the threaded hole 2612. Pulled by the screw 2604 the clamping wedge 2602 will push out a cylindrical outer surface 2616 of the heat sink 2600, so that when the heat sink 2600 is installed in an LED light bulb such as depicted in FIG. 25, the cylindrical outer surface 2616 will be forced against the ID's 2529, 2534 of the annular MCPCB's 2518, 2528. A small coil spring may be used in lieu of the spring washer. Grease or an anti-seize compound may be applied to the flanks of the clamping wedge 2602 and/or the tapered gap 2606.

Figure 27:
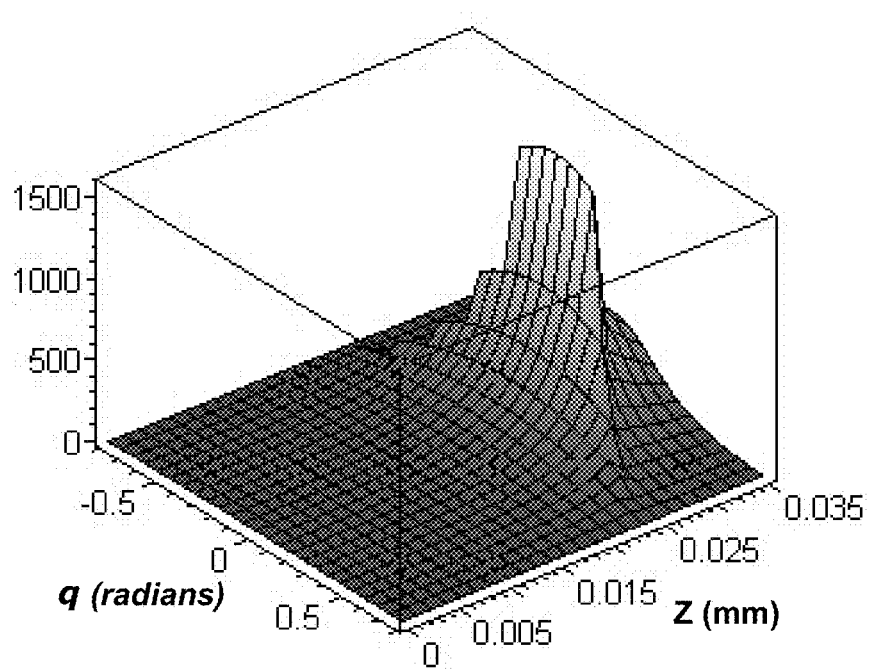
FIG. 27 is a surface plot of illuminance on the tubular housings of LED light bulbs according to embodiments of the invention when using lenses that the produce the light distribution shown in FIG. 13.
Figure 28:
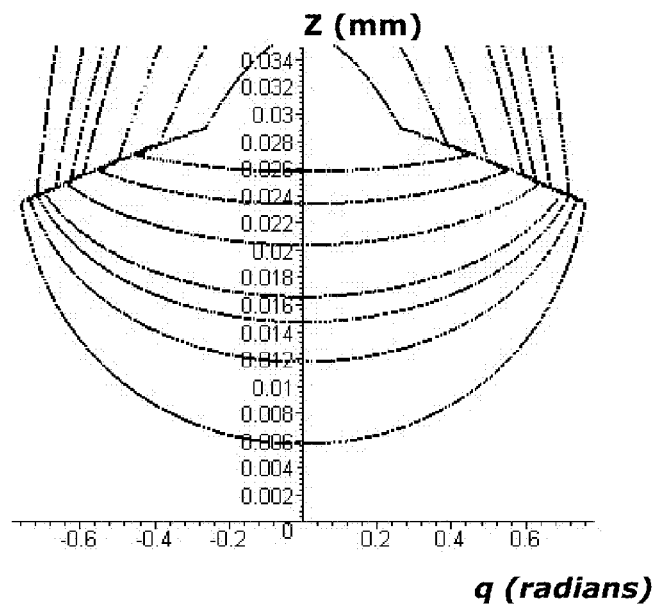
FIG. 28 is a contour plot of the illuminance shown in FIG. 27.

FIG. 27 is a surface plot 2700 of illuminance in relative units on the tubular housings (e.g., 406, 2506) of LED light bulbs according to embodiments of the invention when using lenses that the produce the light distribution shown in FIG. 13. Position on the tubular housing is expressed in terms of a Z (vertical) coordinate and an azimuthal coordinate θ. A first axis in the plot indicates Z coordinate. In this plot the LEDs are assumed to be positioned at Z=35.0 mm and the bottom of the tube is assumed to be at Z=0.0 mm. Such dimensions can work for an LED light bulb that fits within the A19 size dimensional envelope, and so are used for illustration. A second axis in the plot indicates azimuthal angle Θ in radians. The azimuthal angle extends from −π/4 to π/4. When, as discussed above in the context of FIG. 15, the tube diameter is equal to cos(π/4) times the radial coordinate of the LEDs from the centerline of the light bulb (e.g., 2500), a given LED will illuminate an azimuthal range tube of π/2, thus the range −π/4 to π/4 is sufficient for the plot 2700. As shown in FIG. 27 the illuminance on the tube is highly non-uniform. This is due to (1) non uniformity of the light distribution shown in FIG. 13, (2) widely varying distance between the LEDs and positions on the tube and (3) widely varying angle of incidence on the tube. FIG. 28 is a contour plot of the illuminance shown in FIG. 27, the contours shown in FIG. 28 are isolux contours. By positioning the ventilation holes (e.g., 2558) at positions on the tube where the light intensity is low, the amount of light lost into the ventilation holes can be reduced. The isolux contours shown in FIG. 28 can be used as a guide as to where to position the ventilation holes.

Figure 29:
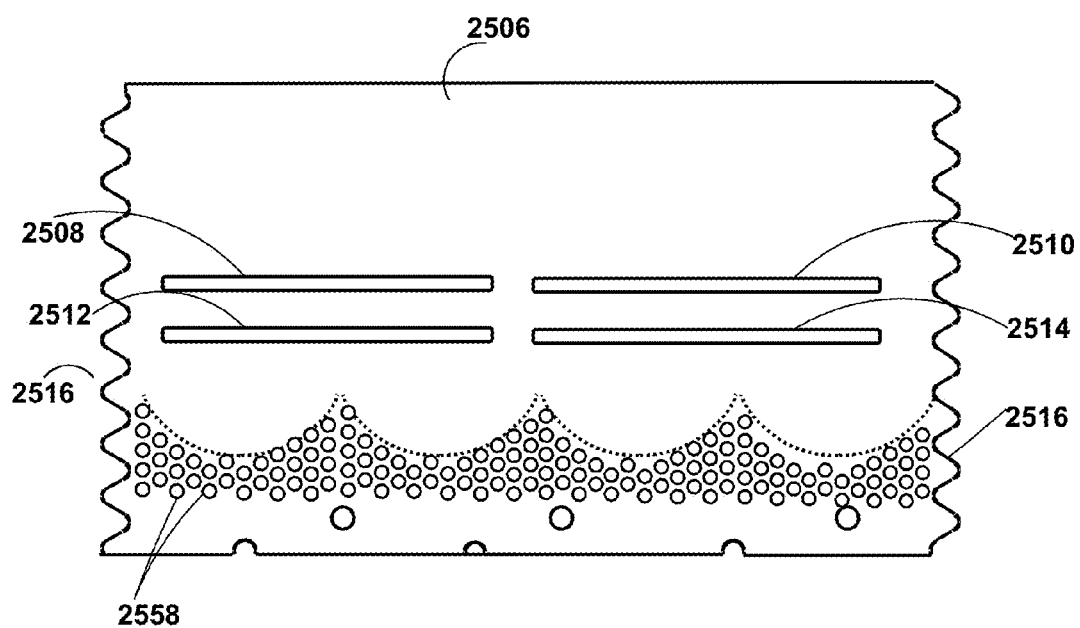
FIG. 29 shows the layout of sheet metal used to form the tubular housing of the LED light bulb shown in FIG. 25 according to an embodiment of the invention.

FIG. 29 shows the layout of sheet metal used to form the tubular housing 2506 of the LED light bulb 2500 shown in FIG. 25 according to an embodiment of the invention. FIG. 29 shows the sheet metal in a flat stated before being rolled into a tube shape. The dashed line 2902 indicates the position of the isolux contour shown in FIG. 28 that cross the Z-axis at Z=15 mm. As shown the in FIG. 29 the ventilation holes 2558 (only two of which are labeled to avoid crowding the drawing) are positioned below the isolux line 2902 in an area of low illuminance. In this manner the light absorbed by the ventilation holes 2558 is reduced.

FIG. 30 shows the layout of sheet metal used to form the tubular housing 3000 of LED light bulbs according to an alternative embodiment of the invention. FIG. 30 also shows the sheet metal in a flat state before being rolled into a tube shape. In this embodiment, the ventilation holes 2558 are replaced by punched tabs 3002 that are punched into the tube. The tabs include free ends and the tabs are oriented such that the free ends face in the direction of the LEDs. Letter x's symbolize the positions of the LEDs. The LEDs are radially spaced from the tubular housing 3000, so in the flattened depiction of FIG. 30, the radial spacing is analogous to the LEDs being positioned in from of the plane of the drawing sheet at the location of the x's. Light from LEDs would generally arrive at the tabs at such an angle that it could not pass through the gap between the free end of the tabs and the adjacent surface of the housing because in order to do so the light would need to bend around an edge. So FIG. 30 represents an alternative way to reduce light loss through ventilation openings. Optionally one could use both ventilation holes and lanced tabs in a single tubular housing.

Figure 32:
FIG. 32 is a side view of an assembly of fins and leaf springs of the type shown in FIG. 32.
Figure 33:
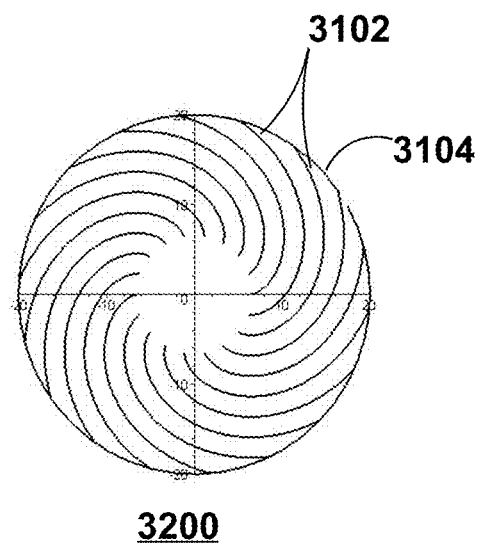
FIG. 33 is a top view of a cylindrical heat sink made from the assembly shown in FIG. 32.

FIG. 31 is a perspective view a single fin 3102 of a stamped fin heat sink 3200 (FIGS. 32, 33) along with a pair of leaf springs 3104, 3106 used to press a base portion of the fin against the inside diameters (e.g., 2529, 2534) of an annular MCPCBs (e.g., 2518, 2528) according to an alternative embodiment of the invention. The leaf springs 3104, 3106 are inserted through a pair of stamped openings 3108, 3110 that are located adjacent a base portion 3112 of the fin 3102. In an assembled LED light bulb, e.g., 2500 the base portion 3112 will make contact with the ID's (e.g., 2529, 2534) of the annular MCPCBs (e.g., 2518, 2528). A tab 3114 is used a location stop to set the location of each fin 3102 relative to an adjacent fin 3102. FIG. 32 is a side view of an assembly of fins 3102 and leaf springs 3104, 3106 of the type shown in FIG. 32, which together form a heat sink 3200. FIG. 33 is a top view of the heat sink 3200 made from the assembly shown in FIG. 32. As shown in FIG. 33 the heat sink 3200 has been rolled into the cylindrical form it takes when installed in an LED light bulb, (e.g., 2500). When installed in an LED light bulb (e.g., 2500) the leaf springs 3104 3106 will be aligned with the IDs (e.g., 2529, 2534) of the annular MCPCBs (e.g., 2518, 2528) and due to their resiliency will force the base portions 3112 of the fins 3102 against the IDs 2529, 2534 established good thermal contact. A thermal interface material may be used between the base portions 3112 of the fins 3102 and the IDs (e.g., 2529, 2534). The heat sink design shown in FIG. 31, 33 is advantageous in that it is light weight and provides direct contact between the fins 3102 and the MCPCB IDs, albeit possibly with an intervening thermal interface material, to reduce thermal contact resistance. Note that the fins 3102 have a spiral shape so as to maintain an approximately constant distance from fin to fin. Although not shown optionally the fins 3102 can be extended further toward the center of the heat sink 3200, but in doing so may not maintain constant spacing distance. In FIGS. 32, 33 only two fins 3102 are numbered to avoid crowding the drawing.

Figure 34:
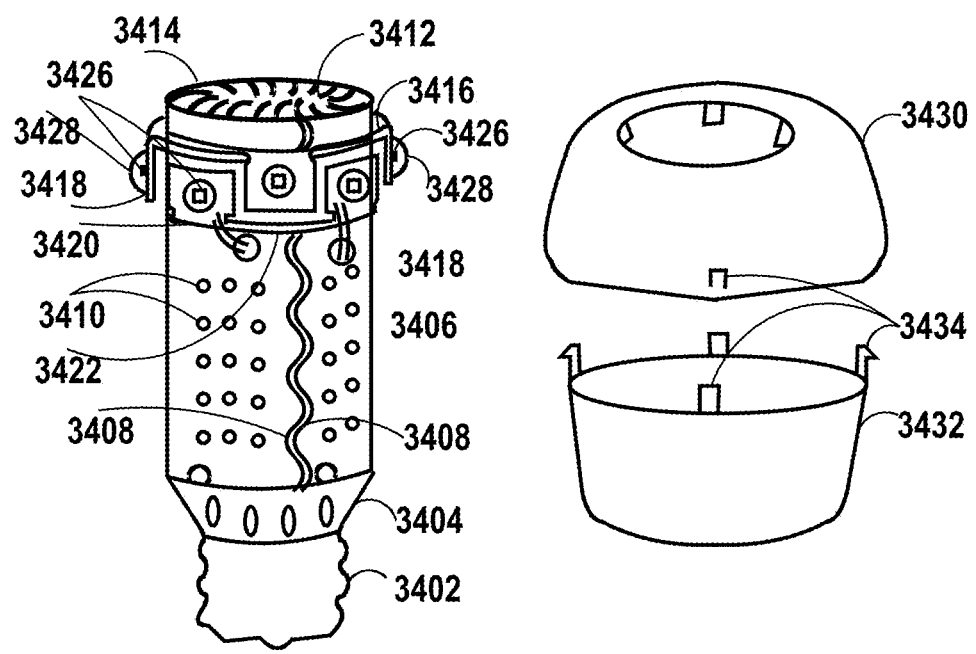
FIG. 34 is perspective view of an LED light bulb according to an alternative embodiment of the invention.

FIG. 34 is perspective view of an LED light bulb 3400 according to an alternative embodiment of the invention. The LED light bulb 3400 includes an Edison base 3402, coupled to a funnel shaped part 3404 to a tubular metal housing 3406. The tubular metal housing 3406 is formed from a piece of sheet metal rolled into a tube with adjoining serpentine shaped edges 3408. The tubular metal housing 3406 also includes an array of ventilation holes 3410 (only two of which are numbered to avoid crowding the drawing). A heat sink 3412 is inserted into a top end 3414 of the tubular metal housing 3406. The LED light bulb 3400 includes an upper MCPCB 3415 that includes an annular ring 3416 and four tabs 3418 that are bent downward from the annular ring 3416 at a 90° angle. Only three of the tabs 3418 are visible in the perspective of FIG. 34. The LED light bulb 3400 also includes a lower MCPCB 3420 that includes an annular ring 3422 and four tabs 3424 that are bent upward from the annular ring 3422 at a 90° angle. Only two of the four tabs 3424 are visible in the view of the drawing. Due to the direction in which tabs 3418, 3424 are bent, surfaces of the tabs 3418, 3424 face in azimuthal directions outward from the LED light bulb 3400. The tabs 3418, 3424 of the upper MCPCB 3414 and the lower MCPCB are interdigitated so as to alternate in position around the LED light bulb 3400. In total there are 8 tabs 3418, 3424 spaced at 360°/8=45° in azimuth angle. Eight LEDs 3426 are mounted on the 8 tabs 3418, 3424 and 8 lenses 3428 that optically coupled to the LEDs are located over the LEDs 3426. The lenses may be shaped to provide substantially uniform luminous intensity over an angular range of $2\pi$ steradian as taught in applicant's co-pending patent application Ser. No. 12/746,800, filed Jan. 15, 2009, entitled "Omnidirectional LED Light Bulb". Such lenses are taught in the above referenced "Illumination Lenses with Light Redistributing Surfaces" and "Illumination Lenses" patent applications. An upper half of a bulb shaped cover 3430 is fitted over the top end 3414 of tubular metal housing 3406. A lower half of the bulb shaped cover 3432 is fitted from below and suitably engages the upper bulb shaped cover 3430 with integrally molded snap fit features 3434. The upper half of the bulb shaped cover 3430 can has integrally molded tabs that fit into the top end 3414 of the tubular metal housing 3406. The lower half of the bulb shaped cover 3432 can have integrally molded snap fit catches that engage in punched openings of the tubular metal housing 3406 (not shown). The bulb shaped covers 3430, 3432 can be diffusive or clear and if diffusive can be made of a transparent plastic that includes light scattering particles, or can be made diffusive by virtue of light diffusive surface relief pattern, or alternatively can include a phosphor either included in the bulk of the material of the bulb shaped covers 3430, 3432 or coated on at least one surface. Phosphor particles scatter light so as to effect a light diffusion function in addition to their wavelength conversion function.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

APPENDIX

Primary Lens Equation

The primary lenses shown in FIGS. 16, 17 are defined by the following differential equation:

$$\frac{\partial}{\partial \phi 1} r1 = \frac{r1 n2 \sin(\phi 2 - \phi 1)}{-n2 \cos(\phi 2 - \phi 1) + n1} \quad \text{DE1}$$

Where, r1 is a radial coordinate of the lens surface;

phi1 is a polar (zenith) angle coordinate of the lens surface, and is also the domain (independent) variable over which the above equation is defined;

n1 is the index of refraction of the lens defined by the equation;

n2 is the index of refraction of the surrounding medium (e.g., of air) which usually equals 1 and phi2 is the polar angle variable for a predetermined specified output light intensity and is equal to the polar angle of an ideal ray that was initially emitted at angle phi1 after the ray has left the surface of each lens defined by the equation and is given by:

$$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \frac{\int_{\phi 3\_MIN}^{\phi 3} \left( \text{rad\_out}(\phi 3) - \sum_{i=1}^{N-1} \text{Error}_i(\phi 3) \right) \cdot 2\pi \cdot \sin(\phi 3) d\phi 3}{\int_{\phi 3\_MIN}^{\phi 3\_MAX} \left( \text{rad\_out}(\phi 3) - \sum_{i=1}^{N-1} \text{Error}_i(\phi 3) \right) \cdot 2\pi \cdot \sin(\phi 3) d\phi 3} \quad \text{EQU. 1}$$

where, phi1_MIN and phi1_MAX are the lower and upper polar angle limits respectively of light collected by each lens defined by DE1;

phi2_MIN and phi2_MAX are the lower and upper polar angle limits respectively of a predetermined specified output light intensity distribution for each lens defined by the DE1;

rad_in(phi1) is the light intensity distribution (e.g., quasi-Lambertian) of the LED for which the lens is designed; and rad_out(phi2) is the predetermined specified output light intensity distribution for each lens defined by the equations, e.g., shown in FIGS. 13, 14, 20 and specified above or in the case of the embodiment shown in FIG. 34 rad_out(phi2)=1;

$\text{Error}_i$ is a difference between a measured distribution and rad_out for an $i^{TH}$ prototype after both have been normalized to a common integrated power;

with initial conditions r1_ini for r1. r1_ini sets the size of the lens.

DE1 is integrated numerically and EQU. 1 is solved numerically for each input value of phi1, as needed, during the integration.

Secondary Lens Equations

The secondary lenses shown in FIGS. 18, 19 are defined by the following equations:

$$\frac{\partial}{\partial \phi 1} r1(\phi 1) = \frac{r1 n2 \sin\left(\frac{1}{2}\phi 1 - \frac{1}{2}\phi 3\right)}{n2 \cos\left(\frac{1}{2}\phi 1 - \frac{1}{2}\phi 3\right) - n1} \quad \text{DE2}$$

$$\frac{\partial}{\partial \phi 1} r2 = r2(\phi 1) \tan\left(\%3 - \arcsin\left(\frac{r1(\phi 1) \sin(\%4)}{r2(\phi 1)}\right)\right) \quad \text{DE3}$$

$$\left(1 - \left(\frac{\frac{n1\cos(\%1)\%5}{(n2\cos(\%1) - n1)\sqrt{\%2}} + \frac{n1\sin(\%1)^2 n2 \%5}{(n2\cos(\%1) - n1)^2 \sqrt{\%2}} - \frac{1}{2} \frac{n1\sin(\%1)\left(2\frac{n2^2 \sin(\%1)\cos(\%1)\%5}{(n2\cos(\%1) - n1)^2} + 2\frac{n2^3 \sin(\%1)^3 \%5}{(n2\cos(\%1) - n1)^3}\right)}{(n2\cos(\%1) - n1)\%2^{(\frac{3}{2})}}}{\sqrt{1 - \frac{n1^2 \sin(\%1)^2}{(n2\cos(\%1) - n1)^2 \%2}}} + \frac{\frac{n2\cos(\%1)\%5}{n2\cos(\%1) - n1} + \frac{n2^2 \sin(\%1)^2 \%5}{(n2\cos(\%1) - n1)^2}}{\%2} - \left(\frac{\left(\frac{\partial}{\partial \phi 1} r1(\phi 1)\right)\sin(\%4)}{r2(\phi 1)} + r1(\phi 1)\cos(\%4)\left(-\frac{\frac{n1\cos(\%1)\%5}{(n2\cos(\%1) - n1)\sqrt{\%2}} + \frac{n1\sin(\%1)^2 n2 \%5}{(n2\cos(\%1) - n1)^2 \sqrt{\%2}} - \frac{1}{2} \frac{n1\sin(\%1)\left(2\frac{n2^2 \sin(\%1)\cos(\%1)\%5}{(n2\cos(\%1) - n1)^2} + 2\frac{n2^3 \sin(\%1)^3 \%5}{(n2\cos(\%1) - n1)^3}\right)}{(n2\cos(\%1) - n1)\%2^{(\frac{3}{2})}}}{\sqrt{1 - \frac{n1^2 \sin(\%1)^2}{(n2\cos(\%1) - n1)^2 \%2}}} + \frac{\frac{n2\cos(\%1)\%5}{n2\cos(\%1) - n1} + \frac{n2^2 \sin(\%1)^2 \%5}{(n2\cos(\%1) - n1)^2}}{\%2}\right) / r2(\phi 1)\right)\right) / \sqrt{1 - \frac{r1(\phi 1)^2 \sin(\%4)^2}{r2(\phi 1)^2}}\right) / \left(1 - \frac{\tan\left(\%3 - \arcsin\left(\frac{r1(\phi 1)\sin(\%4)}{r2(\phi 1)}\right)\right) r1(\phi 1)\sin(\%4)}{r2(\phi 1)\sqrt{1 - \frac{r1(\phi 1)^2 \sin(\%4)^2}{r2(\phi 1)^2}}}\right)$$

$$\%1 := -\frac{1}{2}\phi 1 + \frac{1}{2}\phi 3(\phi 1)$$

$$\%2 := 1 + \frac{n2^2 \sin(\%1)^2}{(n2\cos(\%1) - n1)^2}$$

$$\%3 := \arcsin\left(\frac{n1 \sin(\%1)}{(n2\cos(\%1) - n1)\sqrt{\%2}}\right)$$

$$\%4 := -\%3 + \arctan\left(\frac{n2\sin(\%1)}{n2\cos(\%1) - n1}\right)$$

$$\%5 := -\frac{1}{2} + \frac{1}{2}\left(\frac{\partial}{\partial \phi 1}\phi 3(\phi 1)\right)$$

Where:

n2 is the index of refraction of the lens defined by the equations;

n1 is the index of refraction of the surrounding medium (e.g., of air) which usually equals 1;

phi1 is the polar angular coordinate (zenith angle) of the first lens surface;

phi3 is the polar angle (zenith angle) of an ideal ray (a ray emitted at the origin) that was initially emitted at angle phi1 after the ray has left the second surface of each lens defined by the equations (see FIG. 21) and is given by:

$$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \quad \text{EQU. 2}$$

$$\frac{\int_{\phi 3\_MIN}^{\phi 3} \left(\text{rad\_out}(\phi 3) - \sum_{i=1}^{N-1} \text{Error}_i(\phi 3)\right) \cdot 2\pi \cdot \sin(\phi 3) d\phi 3}{\int_{\phi 3\_MIN}^{\phi 3\_MAX} \left(\text{rad\_out}(\phi 3) - \sum_{i=1}^{N-1} \text{Error}_i(\phi 3)\right) \cdot 2\pi \cdot \sin(\phi 3) d\phi 3}$$

where, phi1_MIN and phi1_MAX are the lower and upper polar angle limits respectively of light collected by each lens defined by the equations;

phi3_MIN and phi3_MAX are the lower and upper limits respectively of a predetermined specified output light intensity distribution for each lens defined by the equations;

rad_in(phi1) is the light intensity distribution of the light source (e.g., LED) for which the lens is designed; and rad_out(phi3) is the predetermined specified output light intensity distribution for each lens defined by the equations e.g., shown in FIGS. 13, 14, 20 and specified above or in the case of the embodiment shown in FIG. 34 rad_out(phi2)=1;

$\text{Error}_i$ is a difference between a measured distribution and rad_out for an $i^{TH}$ prototype after both have been normalized to a common integrated power;

phi2 is a polar angular coordinate of the second lens surface and is given by:

$$\phi 2 = \phi 1 + \arcsin\left(\frac{n1\sin(\%1)}{(-n2\cos(\%1) + n1)\sqrt{\frac{n2^2\sin(\%1)^2}{(-n2\cos(\%1) + n1)^2} + 1}}\right) - \arctan\left(\frac{n2\sin(\%1)}{-n2\cos(\%1) + n1}\right) - \quad \text{EQU. 3}$$

$$\arcsin\left(r1(\phi 1)\sin\left(\arcsin\left(\frac{n1\sin(\%1)}{(-n2\cos(\%1) + n1)\sqrt{\frac{n2^2\sin(\%1)^2}{(-n2\cos(\%1) + n1)^2} + 1}}\right) - \arctan\left(\frac{n2\sin(\%1)}{-n2\cos(\%1) + n1}\right)\right)\right) / r2(\phi 1)$$

$$\%1 := -\frac{1}{2}\phi 1 + \frac{1}{2}\phi 3(\phi 1)$$

and $$\frac{\partial \phi 3}{\partial \phi 1} = \left(\frac{\text{rad\_in}(\phi 1) \cdot 2\pi \cdot \sin(\phi 1)}{\left(\text{rad\_out}(\phi 3) - \sum_{i=1}^{N-1} \text{Error}_i(\phi 3)\right) \cdot 2\pi \cdot \sin(\phi 3)}\right) \cdot \quad \text{EQU. 4}$$

$$\left(\frac{\int_{\phi 3\_MIN}^{\phi 3\_MAX} \left(\text{rad\_out}(\phi 3) - \sum_{i=1}^{N-1} \text{Error}_i(\phi 3)\right) \cdot 2\pi \cdot \sin(\phi 3) d\phi 3}{\int_{\phi 1\_MIN}^{\phi 1\_MAX} \text{rad\_in}(\phi 1) \cdot 2\pi \cdot \sin(\phi 1) d\phi 1}\right)$$

with initial conditions r1_ini and r2_ini for r1(phi1) and r2(phi1) respectively EQU. 2 is solved numerically for to obtain a value of phi3 for each input value of phi1 and DE1 and DE2 are integrated numerically, e.g., using the Runge Kutta integrator.

If phi1_min=phi3_min=0, EQU. 3 will be undefined at phi1_min=0. In this case, instead of using EQU. 4 one can use the values of phi3 obtained from from EQU. 2 at two closely spaced points (e.g., spaced by 0.001) to obtain a finite difference approximation to dphi3/dphi1.

I claim:

1. An LED light bulb comprising at least a first LED and at least a first optical element optically coupled to said first LED and shaped to redistribute light of said at least first LED to cause said LED light bulb to produce a light distribution that has a first local maximum at a zenith angle above 25° and a second local maximum at a zenith angle below 150° and includes less than 50% of a total luminous flux in said light distribution between said first local maximum and said second local maximum.

2. The LED light bulb according to claim 1 wherein said light distribution includes between 20% and 35% of said total luminous flux between said first local maximum and said second local maximum.

3. The LED light bulb according to claim 1 further comprising a second LED and a second optical element optically coupled to said second LED, wherein said first LED faces a first direction parallel to a longitudinal axis of said LED light bulb and said second LED faces a second direction parallel to said longitudinal axis of said LED light bulb that is opposite to said first direction.

4. The LED light bulb according to claim 1 where in the first local maximum is at a zenith angle below 55° and the second local maximum is at a zenith angle above 125°.

5. The LED light bulb according to claim 3 wherein said first optical element comprises a first lens and said second optical element comprises a second lens.

6. An LED light bulb comprising:
an electrical contact base;
at least a first circuit board;
a first plurality of LEDs mounted on said at least first circuit board, said first plurality of LEDs facing toward said electrical contact base;
a second plurality of LED mounted on said at least first circuit board, said second plurality of LEDs facing away from said electrical contact base;
a heat sink coupled to said at least first circuit board;
the LED light bulb having a longitudinal central axis and comprising a housing enclosing a power supply, wherein said first plurality of LEDs and said second plurality of LEDs are located spaced radially from said longitudinal central axis of said LED bulb outside a maximum radial extent of said housing enclosing said power supply;
wherein, said first plurality of LEDs and said second plurality of LEDs are located spaced radially from a longitudinal central axis of said LED light bulb outside a maximum radial extent of said heat sink.

7. The LED light bulb according to claim 6 wherein said at least first circuit board has an annular shape and includes a central hole and said housing extends through said central hole.

8. The LED light bulb according to claim 7 further comprising a second circuit board wherein said first plurality of LEDs are mounted on said first circuit board and said second plurality of LEDs are mounted on said second circuit board.

* * * * *